(12) United States Patent
Wegener

(10) Patent No.: US 9,104,473 B2
(45) Date of Patent: Aug. 11, 2015

(54) CONVERSION AND COMPRESSION OF FLOATING-POINT AND INTEGER DATA

(75) Inventor: Albert W. Wegener, Aptos Hills, CA (US)

(73) Assignee: Altera Corporation, San Jose, CA (US)

(*) Notice: Subject to any disclaimer, the term of this patent is extended or adjusted under 35 U.S.C. 154(b) by 342 days.

(21) Appl. No.: 13/617,061

(22) Filed: Sep. 14, 2012

(65) Prior Publication Data
US 2013/0262539 A1     Oct. 3, 2013

Related U.S. Application Data

(60) Provisional application No. 61/618,509, filed on Mar. 30, 2012.

(51) Int. Cl.
    *G06F 7/00*           (2006.01)
    *G06F 7/483*         (2006.01)

(52) U.S. Cl.
    CPC ..................... *G06F 7/483* (2013.01)

(58) Field of Classification Search
CPC ...... H03M 7/24; G06F 9/30025; G06F 7/572; G06F 7/4876; G06F 7/491
USPC ......................................................... 708/204
See application file for complete search history.

(56) References Cited

U.S. PATENT DOCUMENTS

| | | | |
|---|---|---|---|
| 5,839,100 A | 11/1998 | Wegener | |
| 6,240,431 B1 | 5/2001 | Dyer et al. | |
| 6,253,222 B1 | 6/2001 | Dyer et al. | |
| 6,396,420 B1 | 5/2002 | Augustine | |
| 6,631,392 B1 | 10/2003 | Jiang et al. | |
| 6,701,427 B1 | 3/2004 | Hinds et al. | |
| 7,009,533 B1 | 3/2006 | Wegener | |
| 7,075,530 B2 | 7/2006 | D'Amora | |
| 7,126,501 B2 | 10/2006 | Moriya et al. | |
| 7,209,056 B2 | 4/2007 | Moriya et al. | |
| 7,230,551 B2 | 6/2007 | Moriya et al. | |

(Continued)

FOREIGN PATENT DOCUMENTS

EP          2309648 A1     4/2011

OTHER PUBLICATIONS

Burtscher Martin, et al., "FPC: A High-Speed Compressor for Double-Precision Floating-Point Data," IEEE Transactions on Computers, vol. 58, No. 1, Jan. 2009, 14 pages.

(Continued)

*Primary Examiner* — Tan V. Mai
(74) *Attorney, Agent, or Firm* — Okamoto & Benedicto LLP

(57) ABSTRACT

Compression and decompression of numerical data can apply to floating-point or integer samples. Floating-point samples are converted to integer samples and the integer samples are compressed and encoded to produce compressed data for compressed data packets. For decompression, the compressed data retrieved from compressed data packets are decompressed to produce decompressed integer samples. The decompressed integer samples may be converted to reconstruct floating-point samples. Adaptive architectures can be applied for integer compression and decompression using one or two FIFO buffers and one or two configurable adder/subtractors. Various parameters can adapt the operations of adaptive architectures as appropriate for different data characteristics. The parameters can be encoded for the compressed data packet. This abstract does not limit the scope of the invention as described in the claims.

34 Claims, 26 Drawing Sheets

(56) References Cited

U.S. PATENT DOCUMENTS

| | | | |
|---|---|---|---|
| 7,554,464 | B1 | 6/2009 | Oberdorfer |
| 7,881,371 | B2 | 2/2011 | Malvar |
| 2007/0061388 | A1 | 3/2007 | Carlough et al. |
| 2007/0208792 | A1 | 9/2007 | Berjon et al. |
| 2007/0258641 | A1* | 11/2007 | Srinivasan et al. ............ 382/166 |
| 2011/0078222 | A1 | 3/2011 | Wegener |
| 2011/0099295 | A1 | 4/2011 | Wegener |
| 2012/0078987 | A1 | 3/2012 | Nystad |
| 2012/0166510 | A1 | 6/2012 | Chen et al. |
| 2013/0007076 | A1 | 1/2013 | Wegener |
| 2013/0007077 | A1 | 1/2013 | Wegener |
| 2013/0007078 | A1 | 1/2013 | Wegener |

OTHER PUBLICATIONS

Fulscher, Markus et al., "An Electron Repulsion Integral Compression Algorithm," J. of Computational Chem., vol. 14, No. 1, Jan. 1993, pp. 8-12.

Gamito, Manuel N., et al. "Lossless Coding of Floating Point Data with JPEG 2000 Part 10," Applications of Digital Image Processing Conference XXVII, vol. 5558, Aug. 2004, 12 pages.

International Search Report and Written Opinion from PCT/US2012/044424 mailed Dec. 20, 2012, 10 pages.

Katahira, Kazuya et al. "FPGA-based Lossless Compressors of Floating-Point Data Streams to Enhance Memory Bandwidth," IEEE ASAP Conference, Jul. 2010, 8 pages.

Lindstrom, Peter et al. "Fast and Efficient Compression of Floating-Point Data," IEEE Trans. on Visualization and Computer Graphics, vol. 12, No. 5, Sep. 2006, 6 pages.

Stradella, Omar G., et al. "Techniques for the Compression of Sequences of Integer Numbers for Real Numbers with Fixed Absolute Precision," Journal of Computational Chemistry, vol. 14, No. 6, Jun. 1993, 673-679.

Tomari, Hisanoubu et al., "Compressing Floating-Point Number Stream for Numerical Applications," Proceedings 2010 First International Conference on Networking and Computing (ICNC 2010), IEEE Computer Society, pp. 112-119, Nov. 2010.

Wegener, U.S. Appl. No. 13/616,898, filed on Sep. 14, 2012, 83 pages.

Wegener, U.S. Appl. No. 13/617,205, filed on Sep. 14, 2012, 70 pages.

Zhou, Tong et al. "An entropy coding method for floating-point texture coordinates of 3D mesh," Proc. of 2010 IEEE Int'l Symp. on Circuits and Systems (ISCAS), May/Jun. 2010, 4 pages.

Int'l Search Report and Written Opinion mailed Jun. 26, 2013 in PCT/US13/34433 14 pp.

* cited by examiner

| Exps per Token | Encoding technique | Exp diff(s) {diff(i), diff(i-1)} or Absolute exp(i) | Exponent Token (hex) | Token Length (# bits) | Bits per Exp |
|---|---|---|---|---|---|
| (A) | | | | | |
| 2 | DIFF (2 EXPS) | {-1, -1} | 0x0 | 4 | 2 |
| 2 | DIFF (2 EXPS) | { 0, -1} | 0x1 | 4 | 2 |
| 2 | DIFF (2 EXPS) | {+1, -1} | 0x2 | 4 | 2 |
| 2 | DIFF (2 EXPS) | {-1,  0} | 0x3 | 4 | 2 |
| 2 | DIFF (2 EXPS) | { 0,  0} | 0x4 | 4 | 2 |
| 2 | DIFF (2 EXPS) | {+1,  0} | 0x5 | 4 | 2 |
| 2 | DIFF (2 EXPS) | {-1, +1} | 0x6 | 4 | 2 |
| 2 | DIFF (2 EXPS) | { 0, +1} | 0x7 | 4 | 2 |
| 2 | DIFF (2 EXPS) | {+1, +1} | 0x8 | 4 | 2 |
| (B) | | | | | |
| 1 | DIFF (1 EXP) | -2 | 0x9 | 4 | 4 |
| 1 | DIFF (1 EXP) | -1 | 0xA | 4 | 4 |
| 1 | DIFF (1 EXP) | 0 | 0xB | 4 | 4 |
| 1 | DIFF (1 EXP) | +1 | 0xC | 4 | 4 |
| 1 | DIFF (1 EXP) | +2 | 0xD | 4 | 4 |
| (C) | | | | | |
| 1 | ABS (1 EXP) | {0,2, 3, ... 32} | 111aaaaa | 8 | 8 |

Figure 13

| Blk # | Samples | Max mag | Exponent n_exp(i) + sign bit | Exp diff diff(i) | Joint Exp Token (binary) | Bits/ exp token |
|---|---|---|---|---|---|---|
| 1 | {6874, -392, -42, 18} | 6874 | 14 | (abs) | 1110 1110 (C) | 8 |
| 2 | {-29, 43, -1, -44} | 44 | 7 | (abs) | 1110 0111 (C) | 8 |
| 3 | {32, 40, -24, -30} | 40 | 7 | 0 | diff(i-1) = 0 (A) | - |
| 4 | {120, 16, 18, -46} | 120 | 8 | +1 | {+1, 0} → 01 01 (A) | 4 |
| 5 | {51, 5, -6, -1} | 51 | 7 | -1 | diff(i-1)= -1 (A) | - |
| 6 | {-29, 58, -17, -1} | 58 | 7 | 0 | {0, -1} → 00 01 (A) | 4 |
| 7 | {12, 60, 111, 50} | 111 | 8 | +1 | {+1} → 1100 (B) | 4 |
| 8 | {6, -16, 4, 30} | 30 | 6 | -2 | {-2} → 1001 (B) | 4 |

Figure 15

| Center Frequency | Sample Separation | Add/Subtract | Equation |
|---|---|---|---|
| 0 (baseband) | 1 | SUB | $x(n) - x(n-1)$ |
| SR/8 | 4 | ADD | $x(n) + x(n-4)$ |
| SR/6 | 3 | ADD | $x(n) + x(n-3)$ |
| SR/4 | 2 | ADD | $x(n) + x(n-2)$ |
| SR/3 | 3 | SUB | $x(n) - x(n-3)$ |
| SR/2 | 1 | ADD | $x(n) + x(n-1)$ |

Figure 19

CONVERSION AND COMPRESSION OF FLOATING-POINT AND INTEGER DATA

RELATED APPLICATIONS

This application claims benefit of U.S. Provisional Patent Application No. 61/618,509 filed on 30 Mar. 2012, entitled CONVERSION AND COMPRESSION OF FLOATING-POINT AND INTEGER DATA.

This application is related to co-pending U.S. Patent Application No. 61/618,534, filed on 30 Mar. 2012, entitled DATA COMPRESSION FOR DIRECT MEMORY ACCESS TRANSFERS, and is also related to co-pending U.S. Patent Application No. 61/618,463, filed on 30 Mar. 2012, entitled PROCESSING SYSTEM AND METHOD INCLUDING DATA COMPRESSION API, all of which are incorporated by reference.

BACKGROUND

1. Field of the Invention

The present invention relates to compression of numerical data represented in a floating-point format or an integer format for efficient storage and transfer in a computing system. In particular, the floating-point data are converted to integer, or fixed-point, representations prior to compression processing.

2. Description of Related Art

In present high performance computing applications, it is often necessary to transfer vast amounts of numerical data among multiple processor cores or between processor cores and memory. The limited data transfer rates of interfaces among processor cores and between cores and memory devices can create bottlenecks for overall data processing speed and performance. In data rich applications, storage of numerical data challenges memory and network resources and storage devices. Reducing the demands on data transfer and storage capacity for numerical data can improve the efficiency, economy and performance of the computing system. Compression of the numerical data may reduce these demands, however at the cost of additional computations. In applications having vast quantities of numerical data, it is especially important that the compression be computationally efficient in order to minimize demands on computing resources.

Commonly owned patents and applications describe a variety of compression techniques applicable to fixed-point, or integer, representations of numerical data or signal samples. These include U.S. Pat. No. 5,839,100 (the '100 patent), entitled "Lossless and loss-limited Compression of Sampled Data Signals" by Wegener, issued Nov. 17, 1998, and the U.S. patent application Ser. No. 12/605,245 (the '245 application), entitled "Block Floating Point Compression of Signal Data," publication number 2011-0099295, published Apr. 28, 2011. The commonly owned patent application Ser. No. 12/891,312 (the '312 application), entitled "Enhanced Multi-processor Waveform Data Exchange Using Compression and Decompression," by Wegener, publication number 2011-0078222, published Mar. 31, 2011, incorporated herein by reference, describes configurable compression and decompression for fixed-point or floating-point data types in computing systems having multi-core processors. In a multi-core processing environment, input, intermediate, and output waveform data are often exchanged among cores and between cores and memory devices. The '312 application describes a configurable compressor/decompressor at each core that can compress/decompress integer or floating-point waveform data. The '312 application describes configurable compression/decompression at the memory controller to compress/decompress integer or floating-point waveform data for transfer to/from off-chip memory in compressed packets. The configurable compressor and decompressor of the '312 application may be configured to apply the compression and decompression described in the present application. The commonly owned non-provisional patent application Ser. No. 13/534,330, filed Jun. 27, 2012, entitled "Computationally Efficient Compression of Floating-Point Data," describes algorithms for direct compression floating-point data by processing the exponent values and the mantissa values of the floating-point format.

FIG. 1 is a diagram illustrating an example of a floating-point data format used in a computing system. This floating-point format is presented for illustrative purposes only. The compression and decompression described herein are not limited to this particular representation of floating-point data. In FIG. 1, the floating-point format represents a floating-point number 10 by an array of binary bits. The floating-point number 10 occupies a number of bits NB that include a single sign bit 12, the number of bits NE representing an exponent 14 and the number of bits NM representing a mantissa 16, also referred to as a significand. The sign bit 12 has a value of s=0 for positive numbers and s=1 for negative numbers. The numbers of bits NB, NE and NM may be specified by the floating-point format. For example, the IEEE-754 Standard for Floating-Point Arithmetic, referred to as "IEEE-754 standard", defines single precision and double precision floating-point formats. For single precision, the number of bits NB=32, the number of exponent bits NE=8 and the number of mantissa bits NM=23. To construct a single precision floating-point number from a fixed-point binary number, the leading "1" of the binary fixed-point number is shifted to the left of the binary point and the fractional part is stored in NM bits of the floating-point mantissa 16. The leading "1" is not stored in the floating-point mantissa 16. In order to store only positive values for the floating-point exponent 14, an exponent bias of 127 is added to the value of the exponent. The value of the single precision floating-point number in sign and magnitude notation is given by, $$(-1)^s \times 1.m \times 2^{(e-e0)} \qquad (1)$$

where s is the value of the sign bit 12, m is the binary value of the mantissa 16, e is the binary value of the exponent 14 and e0=127, the exponent bias for single precision. For e0=127, the exponent term (e−e0) in equation (1) can be any value in the range of $-127 \le (e-e0) \le 128$. For double precision floating-point format, the IEEE-754 standard specifies the number of bits NB=64, the number of exponent bits NE=11, the number of mantissa bits NM=52 and the exponent bias e0=1023. In equation (1), the "1.m" term contains a "1" before the binary point that is not explicitly encoded in the mantissa "m", but is implicit in the floating-point format. The implicit "1" is referred to as the "hidden bit".

In order to better meet the requirements of higher speed data transfer, reduced memory utilization and minimal computation in many computing applications, a need exists for computationally efficient compression and decompression of floating-point data and integer data.

SUMMARY

Data transfer operations for numerical data among components of a computer system are augmented by compression. Floating-point samples are converted to integer samples and the integer samples are compressed and encoded to produce compressed data for compressed data packets. The compressed data packets allow efficient data transfer among computer system components, such as transfers between processor cores in a multi-core computer architecture, transfers between the processor and memory, transfers between two memories (such as on-chip and off-chip). For decompression, the compressed data retrieved from compressed data packets are decompressed to produce decompressed integer samples. The decompressed integer samples may be converted to reconstruct floating-point samples.

The floating-point to integer conversion applies a scale factor to a plurality of the floating-point samples. The scale factor can be included in the compressed data packet. The integer to floating-point conversion applies the scale factor to the corresponding plurality of decompressed integer samples.

An adaptive architecture can be applied for integer compression. A number of previous integer samples can be stored in a first-in-first-out (FIFO) buffer, where one is selected for addition or subtraction operations with a current integer sample to give a first result sample. In one alternative, selection of the current integer sample or the first result sample can provide a compressed integer sample. In another alternative, a number of previous first result samples can be stored in a second FIFO buffer, where one is selected for addition or subtraction with a current first result sample to give a second result sample. In another alternative, previous integer samples can be stored in a second FIFO buffer, where one is selected for addition or subtraction with the current integer sample to give a second result sample. A selection of the current integer sample, the first result sample or the second result sample provides a compressed integer sample. The selection can be based on the alternative that provides more efficient compression. The compressed integer sample is encoded for the compressed data packet. Various parameters can adapt the operations of adaptive compression architecture. The parameters can be encoded for the compressed data packet.

For decompression of the compressed data packet, the compressed data are decoded to produce decoded integer samples. Parameters for decompression can also be recovered from the compressed data packet.

An adaptive architecture for integer decompression can be applied to decoded integer samples to produce decompressed integer samples. A number of previous decoded integer samples can be stored in a FIFO buffer, where one is selected for addition or subtraction operations with a current decoded integer sample to give a first result sample. In one alternative, selection of the current decoded integer sample or the first result sample can provide a decompressed integer sample. In another alternative, a number of previous first result samples can be stored in a second FIFO buffer, where one is selected for addition or subtraction with a current first result sample to give a second result sample. In another alternative, previous decoded integer samples can be stored in a second FIFO buffer, where one is selected for addition or subtraction with the current decoded integer sample to give a second result sample. A selection of the current decoded integer sample, the first result sample or the second result sample provides a decompressed integer sample. Parameters are provided to the adaptive decompressor to invert the compression operations.

For floating-point data, the decompressed integer samples are converted back to the floating-point format to provide reconstructed floating-point samples.

BRIEF DESCRIPTION OF THE DRAWINGS

FIG. 13 illustrates an encoding scheme that uses four or eight bits for an exponent token.

FIG. 15 gives an example of encoding the exponents of eight blocks of samples to form a single compressed packet.

FIG. 19 shows a table of parameter settings as a function of the center frequency.

DETAILED DESCRIPTION

Embodiments of the compression and decompression described herein may encompass a variety of computing architectures that represent digital data numerically using a floating-point format, referred to herein as floating-point data, floating-point numbers and floating-point samples, or an integer format. The digital data may be generated by a variety of applications and the computing architectures may be general purpose or specialized for particular applications. The digital data may result from detected data from a physical process, a data created by computed simulation or intermediate values of data processing. For example, the digital data may arise from analog sensor signals that are converted by an analog to digital converter (ADC) to a digital signal whose sample values are represented in a floating-point format. For another example, the digital data may be spatial data points for a simulated computer graphics image having two or more dimensions.

Figure 1:
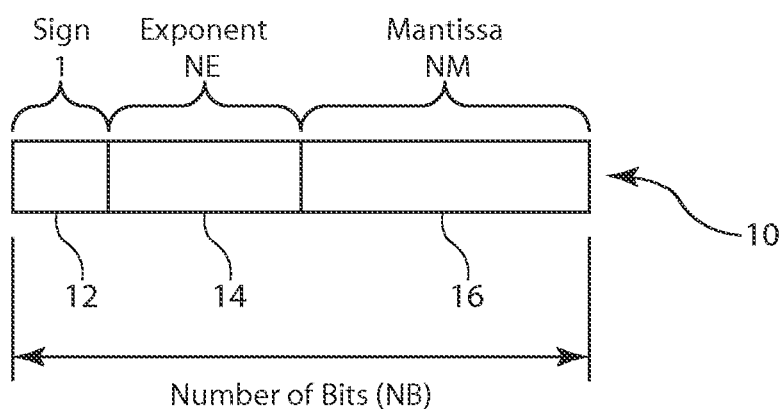
FIG. 1 is a diagram illustrating an example of a floating-point data format used in a computing system.
Figure 2:
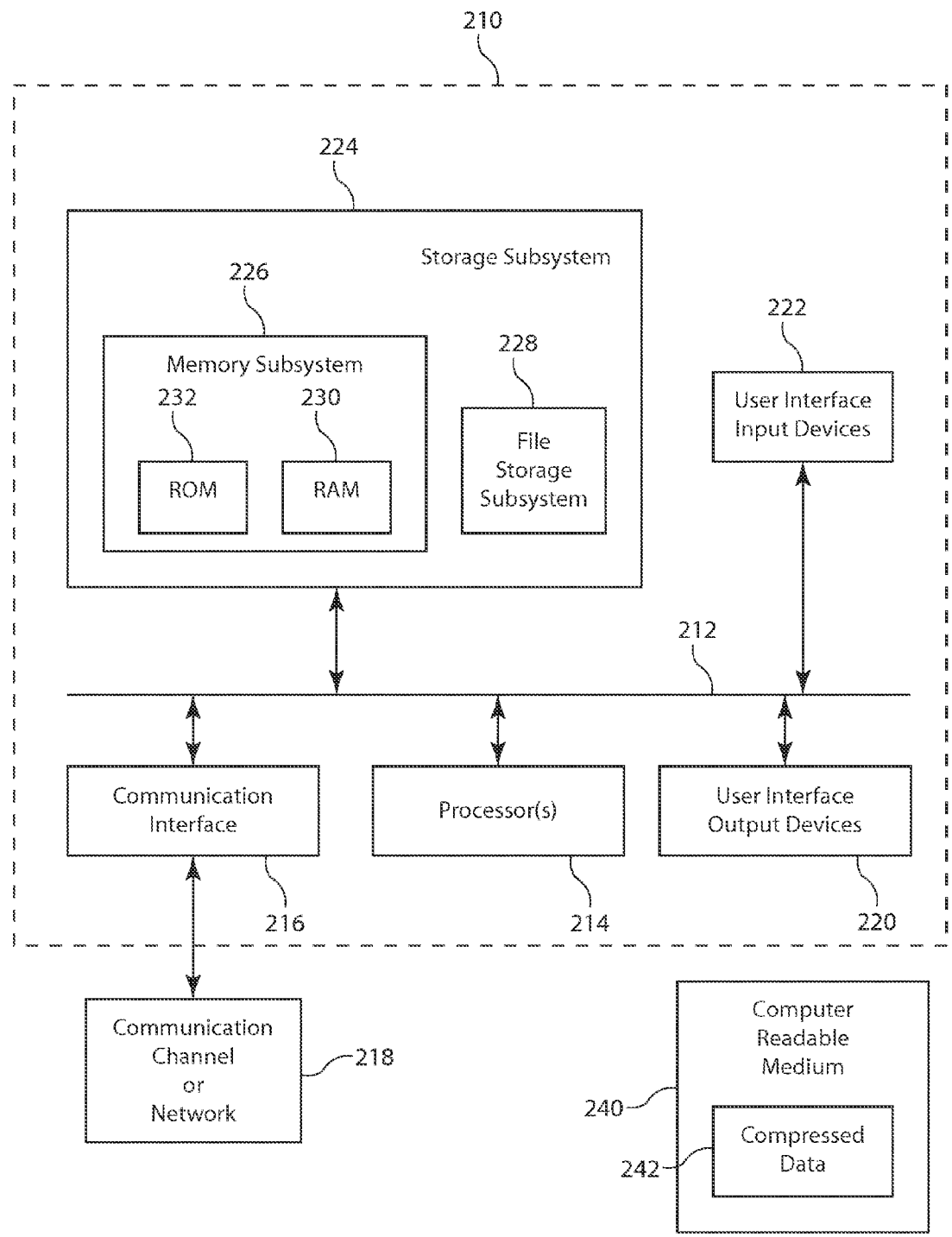
FIG. 2 is a block diagram of a computer system suitable for use with embodiments of the compression and decompression of floating-point data.

FIG. 2 is a block diagram of a computer system suitable for use with embodiments of the compression and decompression described herein. Computer system 210 typically includes at least one processor 214 which communicates with a number of peripheral devices via bus subsystem 212. The processor 214 can represent numerical data in the floating-point format, described with respect to FIG. 1, and an integer format. These peripheral devices may include a storage subsystem 224, comprising a memory subsystem 226 and a file storage subsystem 228, user interface input devices 222, user interface output devices 220, and a communication interface subsystem 216. The input and output devices allow user interaction with computer system 210. Communication interface subsystem 216 provides an interface to communication channel or network 218, which may be a single channel or a communication network having multiple channels. The communication channel or network 218 is coupled to corresponding interface devices in other computer systems, transmitting or receiving devices, or an outside network (not shown in FIG. 2). The communication channel or network 218 may comprise wireline links, optical links, wireless links, or any other mechanisms for communication of information. The data communication network 218 may comprise many interconnected computer systems and communication links. While in one embodiment, communication network 218 is the Internet, in other embodiments, the communication network 218 may be any suitable computer network.

User interface input devices 222 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 210.

User interface output devices 220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display, such as via audio output devices. In general, use of the term "output device" is intended to include all possible types of devices and ways to output information from computer system 210 to the user or to another machine or computer system.

Storage subsystem 224 stores the basic programming and data constructs that may provide some or all of the functions for the format conversion, compression and/or decompression described herein. These software modules are generally executed by processor 214. The processor(s) 214 may include one or more of a DSP, microprocessor, microcontroller, CPU or GPU, or a combination of these devices. The processor(s) 214 may also include dedicated application specific integrated circuit (ASIC) or field-programmable gate array (FPGA) logic implementing some or all of the format conversion, compression and/or decompression functionality.

Memory subsystem 226 typically includes a number of memories including a main random access memory (RAM) 230 for storage of instructions and data during program execution and a read only memory (ROM) 232 in which fixed instructions are stored. File storage subsystem 228 provides persistent storage for program and data files, and may include a hard disk drive, a floppy disk drive along with associated removable media, a CD-ROM drive, an optical drive, or removable media cartridges, including Universal Serial Bus (USB) thumb drives with USB interface and flash media storage. The databases and modules implementing the functionality of certain embodiments may be stored by file storage subsystem 228.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Computer readable medium 240 can be a medium associated with file storage subsystem 228, and/or with communication interface subsystem 216. The computer readable medium 240 can be a hard disk, a floppy disk, a CD-ROM, an optical medium, removable media cartridge, USB thumb drive, flash media storage, or electromagnetic wave. The computer readable medium 240 is shown storing a compressed data file 242. The computer readable medium may also store programs implementing the functions of format conversion, compression and/or decompression.

Computer system 210 itself can be of varying types including a personal computer, a portable computer, a workstation, a computer terminal, a network computer, a mainframe, a television, a smart phone, a tablet computer or any other data processing system or user device. Due to the ever-changing nature of computers and networks, the description of computer system 210 depicted in FIG. 2 is intended only as a specific example for purposes of illustrating the preferred embodiments. Many other configurations of computer system 210 are possible having more or fewer components than the computer system depicted in FIG. 2.

Figure 3:
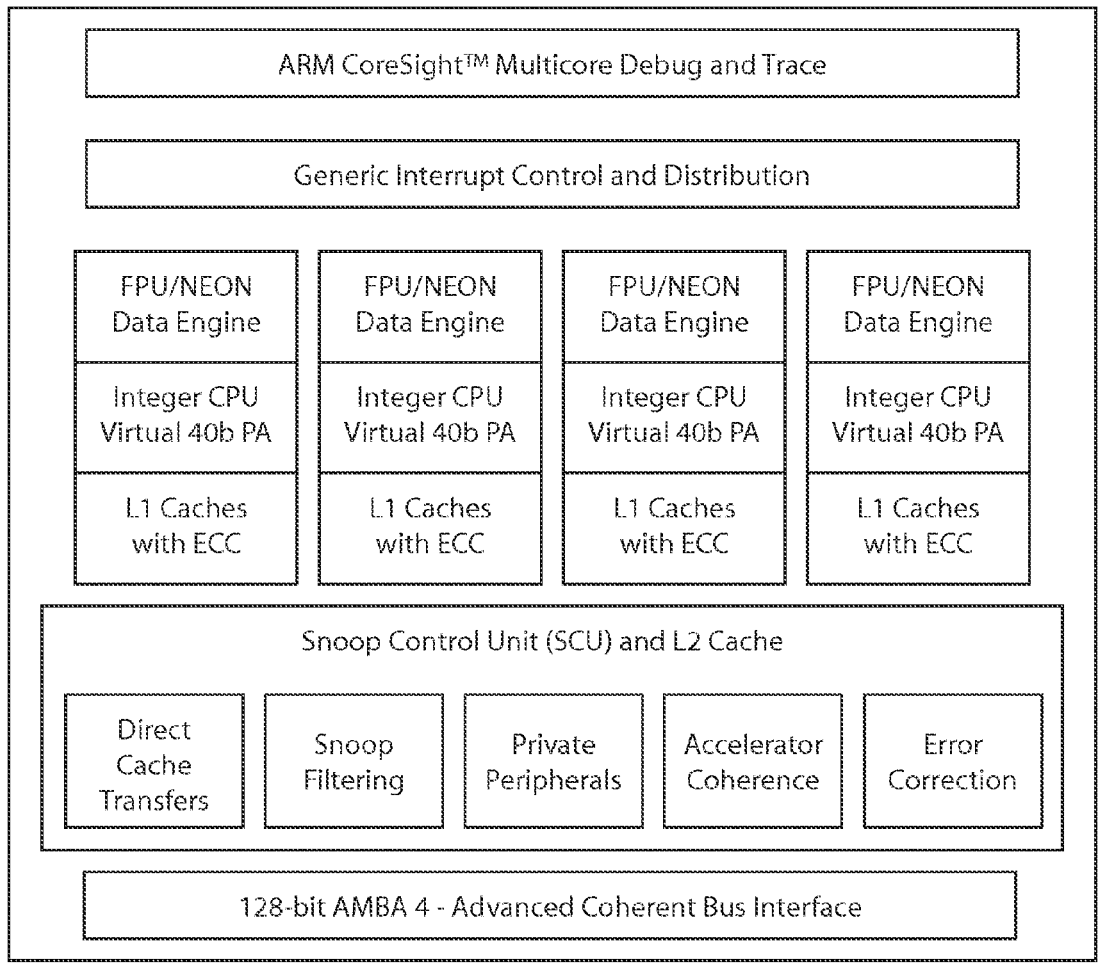
FIG. 3 illustrates a block diagram of a four-core Advance RISC Machines (ARM) Cortex-A15 processor.
Figure 4:
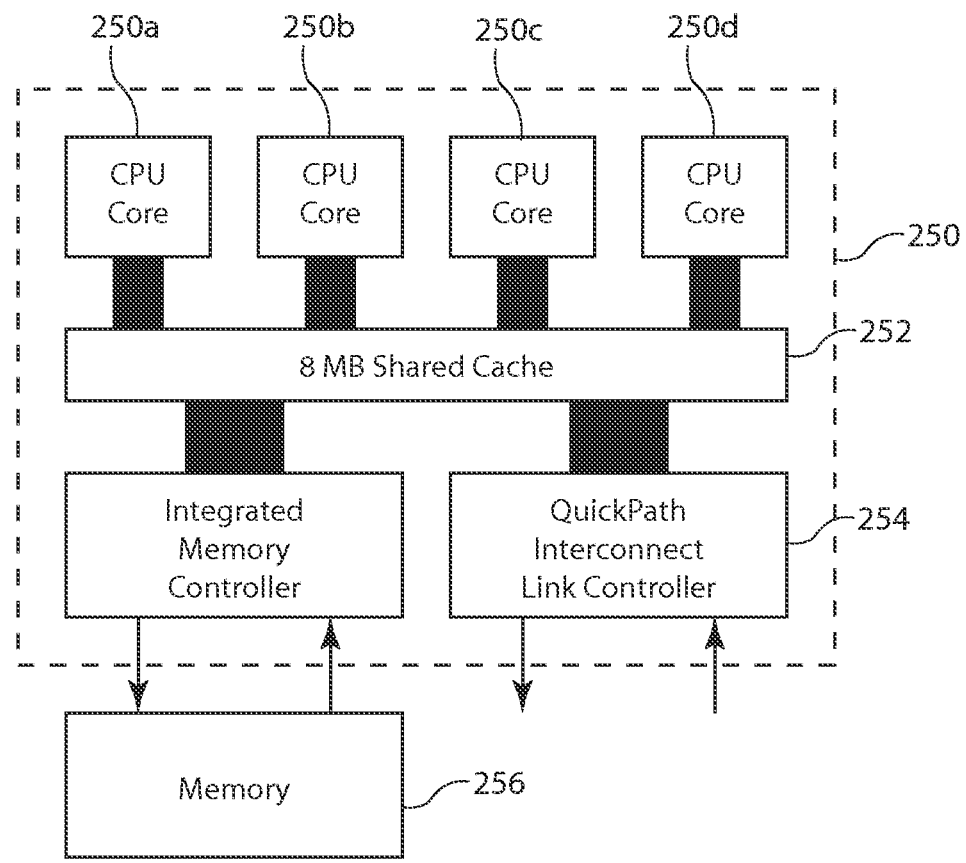
FIG. 4 illustrates the Intel Nehalem CPU architecture.
Figure 5:
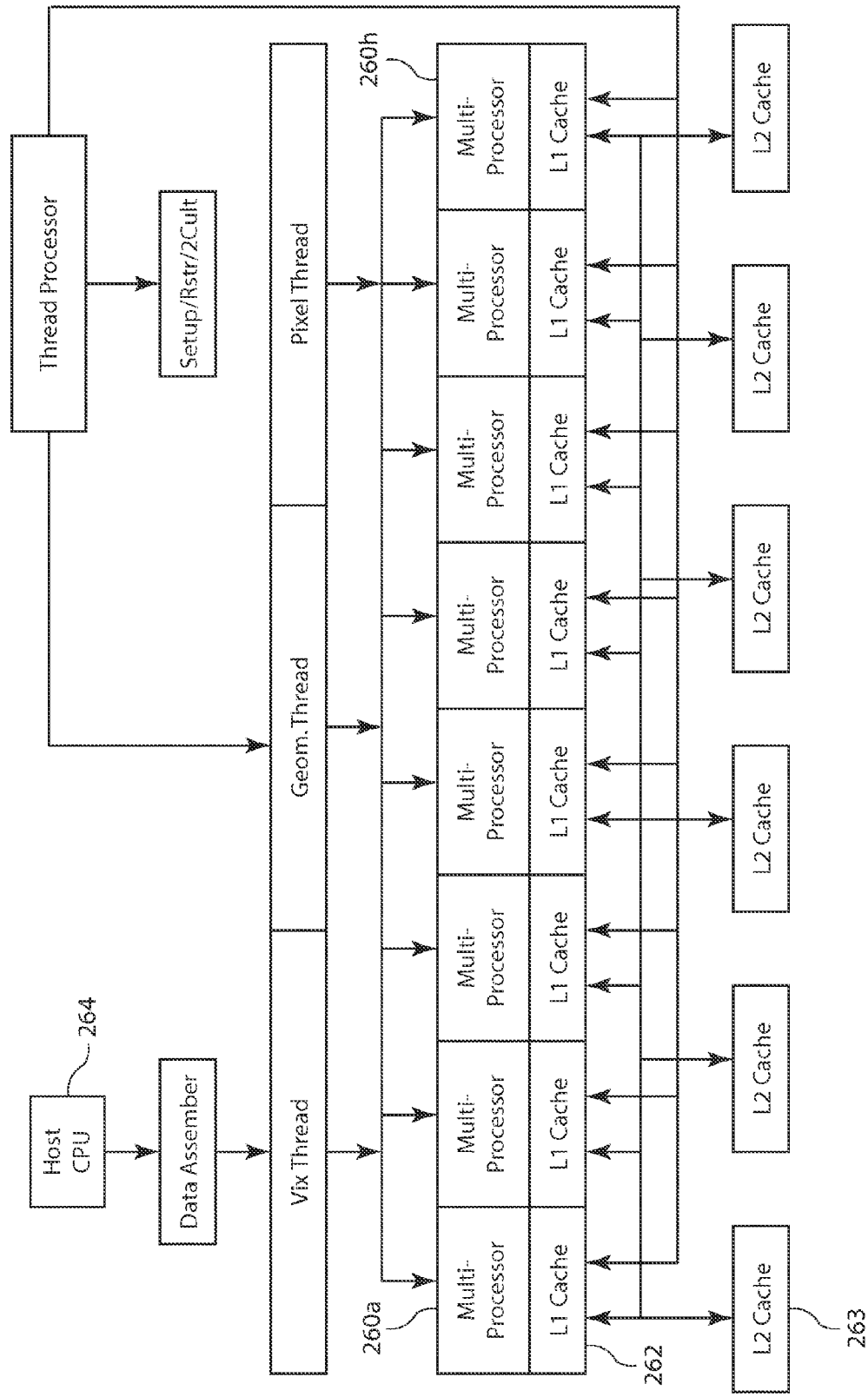
FIG. 5 illustrates the Nvidia GeForce 8800 GPU architecture.

FIGS. 3, 4 and 5 illustrate examples of multiple processor core devices suitable for embodiments of format conversion, compression and decompression. For example, a multiple processor core device may comprise the processor(s) 214 of the computer system 210 of FIG. 2. For another example, a multiple core processor may be embedded in an application device, such as a mobile handset, smartphone, set-top box, medical imaging device, wireless communication infrastructure, and other compute-intensive instruments.

FIG. 3 illustrates a block diagram of a four-core Advance RISC Machines (ARM) Cortex-A15 processor. The A15 core, which ARM introduced in September 2010, is targeted for use in smart phones (one to two A15 cores), wireless base stations (two to four cores), and low-power servers (four to twelve cores). In FIG. 3, the four A15 cores share a Level 2 (L2) cache and connections to the 128-bit AMBA 4 bus. The AMBA 4 bus can connect at least 3 four-core A15 processors, thus allowing A15 users to instantiate as many as twelve A15 cores on a single silicon die. The ARM Cortex-A15 design will typically be fabricated in 32 nm or 28 nm CMOS processes. In FIG. 3, the block labeled "FPU/NEON Data Engine" (FPU=Floating Point Unit; NEON=ARM's Single Instruction, Multiple Data [SIMD] execution unit) could incorporate the format conversion, compression and decompression functions described herein. The Snoop Control Unit (SCU) is an interface for the AMBA 4 bus. The SCU could include an additional block implementing the format conversion, compression and decompression functions. Integer and floating-point data types are sent to, and received from, other A15 cores and from off-chip memories and busses, via the AMBA 4 bus interface. Data compression would add significant additional bandwidth to the AMBA 4 bus, or alternately, would allow AMBA 4 transfers to require significantly less power when compared to existing uncompressed transfers of floating-point and integer numbers.

FIG. 4 illustrates the Intel Nehalem CPU architecture. The Intel Nehalem CPU 250 contains four processor cores 250a, 250b, 250c, and 250d on one die, with a shared cache 252 having a capacity of 8 MB. The processor cores 250a through 250d access other computer system peripherals through a pair of Quick Path Interconnect (QPI) interfaces 254. The QPI interfaces 254 use a packet-based communication protocol. Some versions of Intel CPUs also use one or more QPI interfaces 254 to communicate with other Intel CPUs on other sockets also having one or more QPI interfaces 254. Compressed data may be transferred among CPU cores 250a-d, cache 252, memory 256, and QPI interfaces 254. A compressor can be integrated at each QPI interface 254, such as by integration into the QPI interface's associated link controller(s), to compress data for the payloads of the QPI packets to be transmitted and to decompress the compressed data from the payloads of the received QPI packets. An off-chip input controller (not shown) for providing data for the Nehalem processor may compress the data to form compressed payload data for the QPI packets. A decompressor at the QPI interconnect link controller 254 decompresses the compressed payload data and provides the decompressed data as payload data for QPI packets for transfer to the CPU cores 250a-d. The CPU cores 250a-d may also implement a compressor and decompressor for data transfers. The integrated memory controller may also include a compressor and a decompressor to compress waveform data provided to off-chip memory and to decompress compressed waveform data retrieved from memory. Alternately, the CPU may also include enhanced instructions to accelerate some or all of the compression and/or decompression functions. These compressors and decompressors can apply format conversion, compression and decompression described herein.

FIG. 5 illustrates the Nvidia GeForce 8800 GPU architecture. The Nvidia GeForce 8800 GPU includes 64 processors grouped into 8 multi-processors 260a through 260h. Each multi-processor includes 8 cores. The multi-processors 260a through 260h utilize distributed Level 1 (L1) cache 262 and distributed Level 2 (L2) cache 263 to store input values, intermediate results, and output values, and to exchange such values between cores. The GeForce 8800 receives input data values and transmits output data values from and to a host CPU 264. For example, compression may be integrated into the host-to-GPU and GPU-to-host communications controller for the data assembler. Format conversion, compression and decompression may also be integrated into a GPU memory controller (not shown in FIG. 5).

Figure 6:
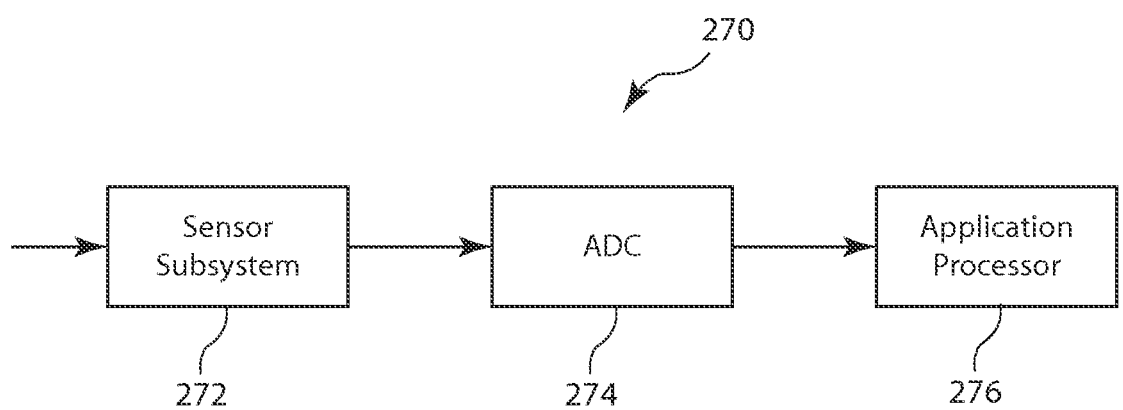
FIG. 6 is a block diagram of a sensor processing system 270.

FIG. 6 is a block diagram of a sensor processing system 270. A sensor subsystem 272 detects a physical signal of a particular modality and provides an analog signal representing the physical measurement to the ADC 274. Examples for the sensor subsystem 272 include an acoustic transducer, an x-ray detector, a radio antenna, a seismic sensor, or an array of sensors. The ADC 274 converts the analog signal to digital signal samples provided to the application processor 276. The application processor 276 may represent the signal samples integers or as floating-point numbers, as shown in FIG. 1. The application processor may have a custom architecture for the application or an architecture as depicted in FIGS. 2 to 5. The application processor 276 may format convert and compress the signal samples for a number of purposes, including storage in an internal memory or external storage device, transfer among processing units within the processor 276 or transfer to an external device for further processing, display, etc.

Data transfer interfaces in a computer system or network of computer systems may generally include interfaces connecting processing units, memories (including off-chip memory), external storage devices and data acquisition devices. The architectures described with respect to FIGS. 2 to 6 give examples of data transfer interfaces in a computer system or network of computer systems. The compression described herein speeds the data rate by reducing the number of bits per sample to be transferred across the data transfer interfaces. Faster data transfer improves the system performance because it reduces the time that processors wait for data. The compression and decompression described below uses simple operations for computational efficiency and low latency.

The floating-point compression processing converts the floating-point data to integer samples and compressing the integer samples to form the compressed data. For decompression processing, the compressed data are decompressed to produce decompressed integer samples that may be converted back to the floating-point format. The integer compression processing may be applied to original integer samples or to converted integer samples.

Figure 7:
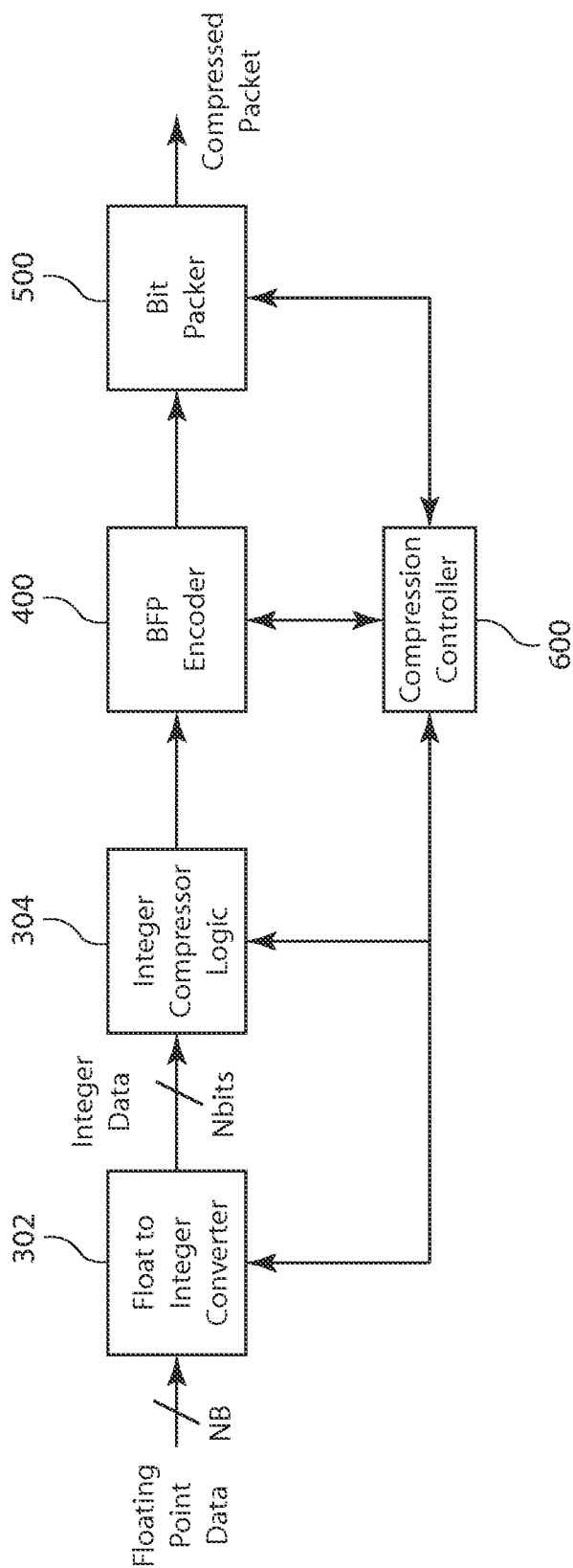
FIG. 7 is a block diagram floating-point data compression in accordance with a preferred embodiment.

FIG. 7 is a block diagram of floating-point data compression in accordance with a preferred embodiment. The input data, represented by floating-point numbers has NB bits per sample. The float to integer format converter 302 converts the floating-point numbers to corresponding integer numbers, or fixed-point numbers, having Nbits bits per sample. The compression processing is applied to the corresponding integer numbers. One or more of the integer compressor logic 304, the block floating point (BFP) encoder 400 and the bit packer 500 may provide compression. The compression controller 600 may provide parameters to configure the operations of the float to integer format converter 302, integer compressor logic 304 and BFP encoder.

The float to integer format converter 302 may normalize a set of input floating-point numbers by using a scale factor to form a set of normalized floating-point numbers. Normalization adapts the range of the fixed-point integer samples to the range of a particular set of input floating-point samples, thus preserving more accuracy. Alternatives for determining the scale factor for the set of input floating-point numbers include the following:

1) Determining the maximum magnitude value (both mantissa and exponent) of the floating-point numbers in the set, f_max, and determining the scale factor F_SCALE using equation (2) below,
2) Using the F_SCALE of a previous set of floating-point numbers for a current set, or
3) Predicting a maximum magnitude value f_max for the current set based on that of one or more previous sets and calculating F_SCALE based on the predicted f_max.

The first option for the scale factor produces scaled floating-point numbers where the maximum magnitude in the set is 1.0 or less, so that floating-point numbers in the set will have values in the range of $\{-1.0, +1.0\}$. The second option reduces the computational latency for the current set. After normalization, the float to integer format converter 302 converts the scaled floating-point numbers to integer numbers.

In an alternative embodiment, the float to integer format converter 302 determines the maximum exponent value of the floating-point numbers in the set. For this alternative, the float to integer format converter 302 may provide approximate normalization during format conversion, without a multiplication by the floating-point scale factor F_SCALE. This reduces computational complexity by eliminating the floating-point multiplier. The approximate normalization provides magnitude values less than 2.0 for the set. Alternatives for determining the maximum exponent value for the set include the following:

1) Determining the maximum magnitude exponent value, EXP_SCALE, of the floating-point numbers in the set and providing the EXP_SCALE to the float to integer format converter,
2) Using the maximum magnitude exponent value of a previous set of floating-point numbers for a current set, or predicting a maximum magnitude exponent value for the current set based on that of one or more previous sets, and providing that value as EXP_SCALE to the format converter.

The second alternative reduces the computational latency for the current set.

Figure 8:
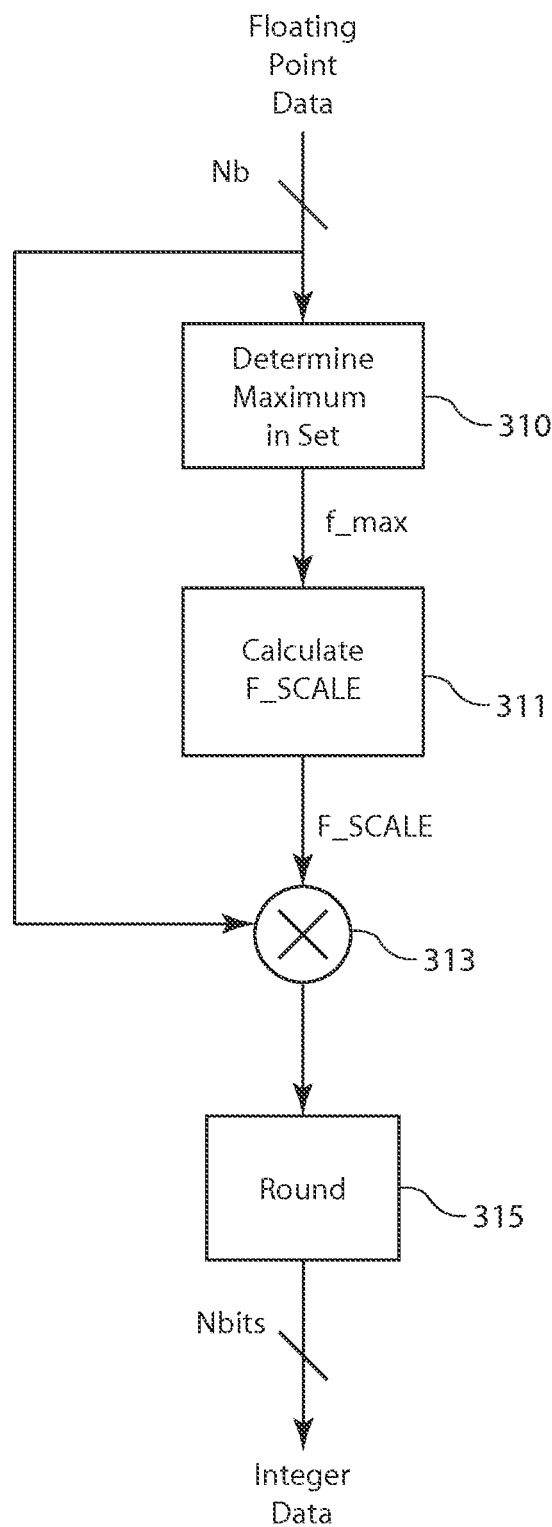
FIG. 8 is a block diagram of the float to integer format converter, in accordance with a first embodiment.

FIG. 8 is a block diagram of the float to integer format converter, in accordance with a first embodiment. The input floating-point data are represented in NB bits per sample, as described with respect to FIG. 1. The number of bits per integer sample at the output is Nbits. Block 310 determines the maximum floating-point value for a set of input floating-point samples, f_max. Block 311 includes logic to calculate the value of F_SCALE, $$F\_SCALE = [2^{(Nbits-1)} - 1]/f\_max \quad (2)$$

The multiplier 313 multiplies the resulting value F_SCALE with each floating-point number in the set by to form a scaled floating-point number. The rounding block 315 includes logic to round each scaled floating-point number to provide the output integer number. The integer number is represented in a binary two's-complement format having Nbit bits. The two's-complement integer format is used for illustrative purposes. The particular integer format does not limit the scope of the invention, as the floating-point data may be converted to other integer formats.

Figure 9:
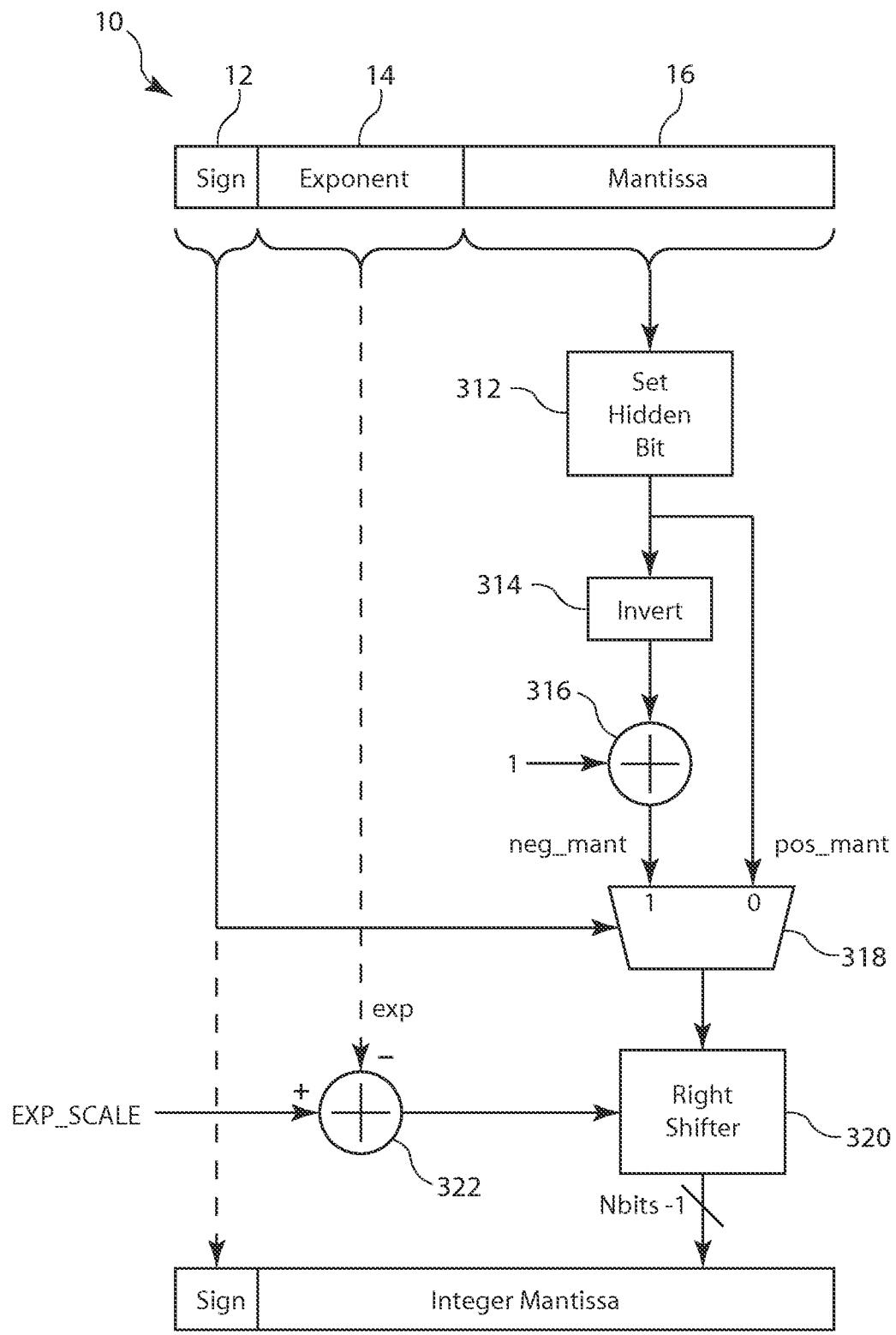
FIG. 9 is a block diagram of the float to integer format converter according to an alternative embodiment.

FIG. 9 is a block diagram of the float to integer format converter according to an alternative embodiment. For this embodiment, the sign bit 12, exponent bits 14 and mantissa bits 16 are separately processed to produce an integer in two's-complement format. For IEEE 754 single precision format, the mantissa 16 has NM=23 bits and the exponent 14 has NE=8 bits. For IEEE 754 double precision format, the mantissa 16 has NM=32 bits and the exponent 14 has NE=11 bits. Block 312 sets the "hidden bit" to "1" for the integer mantissa. The hidden bit corresponds to the leading one of the integer mantissa. The resulting mantissa may provide a positive mantissa, "pos_mant". In two's-complement format, a negative number may be represented by inverting the bits of the positive mantissa and adding "1". Block 314 inverts the bits of the positive mantissa and block 316 adds "1" to the inverted bits to provide a negative mantissa, "neg_mant". The sign value, pos_mant and neg_mant are provided to the selector 318. The selector 318 selects pos_mant if the sign value is "0" or neg_mant if the sign value is "1". The resulting selected mantissa is input to right shifter 320. The right shifter 320 shifts the mantissa bits based on the exponent value, "exp," of the input floating-point number 10, or alternatively, by the difference of exp and EXP_SCALE resulting from the adder 322. The shift increment corresponding to the exponent value shifts the mantissa bits to the corresponding bit locations for the integer representation. The shift increment corresponding to EXP_SCALE provides the approximate normalization by the value EXP_SCALE, as described above. Alternatively, when the floating-point number has already been scaled by F_SCALE, the EXP_SCALE value and the adder 322 are not used. In this case, the exponent value "exp" is input to the right shifter 320 and determines the number of right shifts for pos_mant or neg_mant. The right shifter 320 provides the two's-complement integer representation having Nbits per sample. For example, the output integer may have 32 bits. The resulting integer outputs are then compressed using the integer compressor logic 304 and/or the block floating point encoder.

Figure 10:
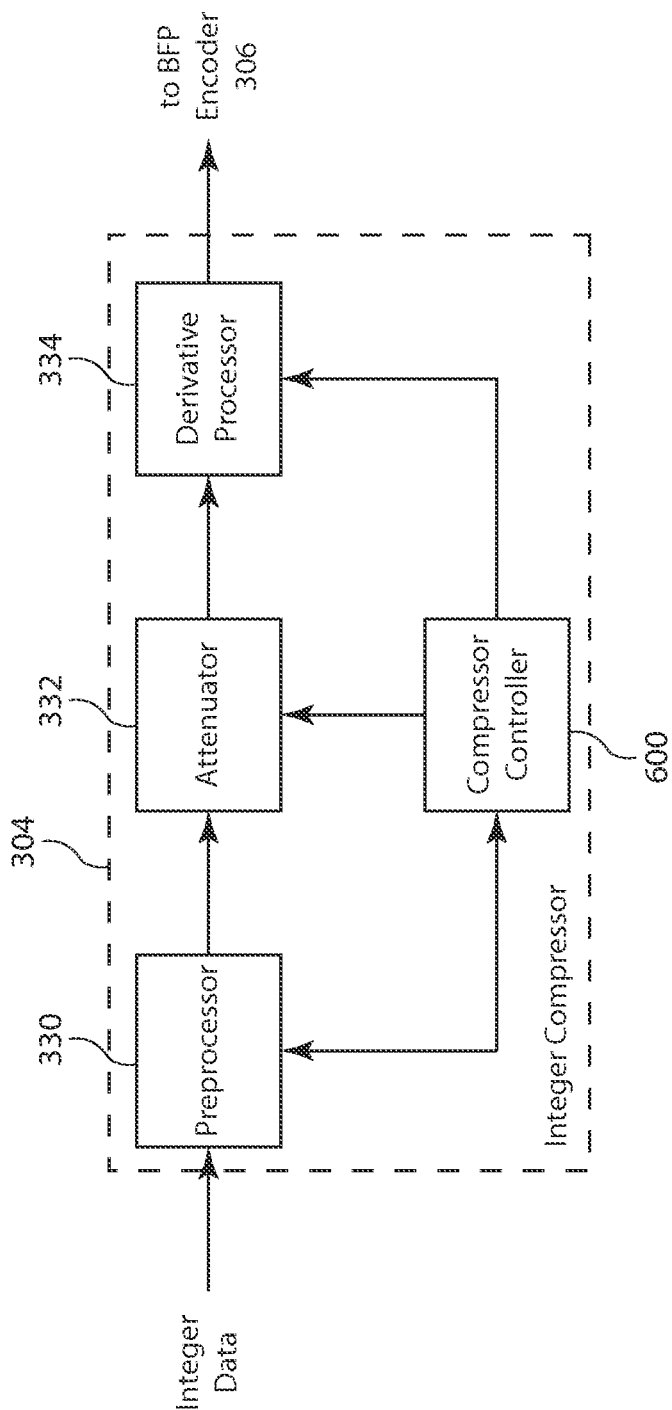
FIG. 10 is a block diagram of exemplary components of the integer compression logic.

FIG. 10 is a block diagram of exemplary components of the integer compressor logic 304. A preprocessor 330 may perform various operations on the integer data for the particular application or to enhance compression performance. The preprocessor 330 may provide operations such as signal conditioning, filtering, down conversion, demultiplexing, temporal or spatial windowing and scaling. In an alternative embodiment, the preprocessor may be applied to the floating-point data prior to the float to integer format converter. An attenuator 332 may remove integer or fractional least significant bits from the integer samples to reduce the bit count. For example, when attenuator 332 is set to a value of 0.5, one least significant bit is removed from each sample. In contrast, when attenuator 332 is set to a value of 0.4, one least significant bit plus a fractional amount of the second-least significant bit is removed from each sample. The output of the attenuator 332 may be applied to a derivative processor 334 which can reduce the dynamic range of the integer samples using first, second or higher-order derivatives (sample differences) for example. Algorithms applied by the integer compressor logic 304 are found in commonly owned U.S. Pat. No. 7,009,533 (the '533 patent), entitled "Adaptive Compression and Decompression of Bandlimited Signals, by Albert W. Wegener, which is incorporated by reference, as if fully set forth herein. Alternatively, the integer compressor logic 304 may include only the attenuator 332 or only the derivative processor 334. The compression controller 600 may provide compression parameters to the preprocessor 330, attenuator 332 and derivative processor 334 to provide a fixed compression rate or a fixed quality of the compressed data.

Alternatively, the integer compressor logic 304 may provide other types of compression, such as predictive compression, as described by Moriya et al. in the U.S. Pat. No. 7,230,551, entitled "Floating-Point Type Digital Signal Reversible Encoding Method, Decoding Method, Apparatuses Therefor, and Programs Therefor".

Figure 11:
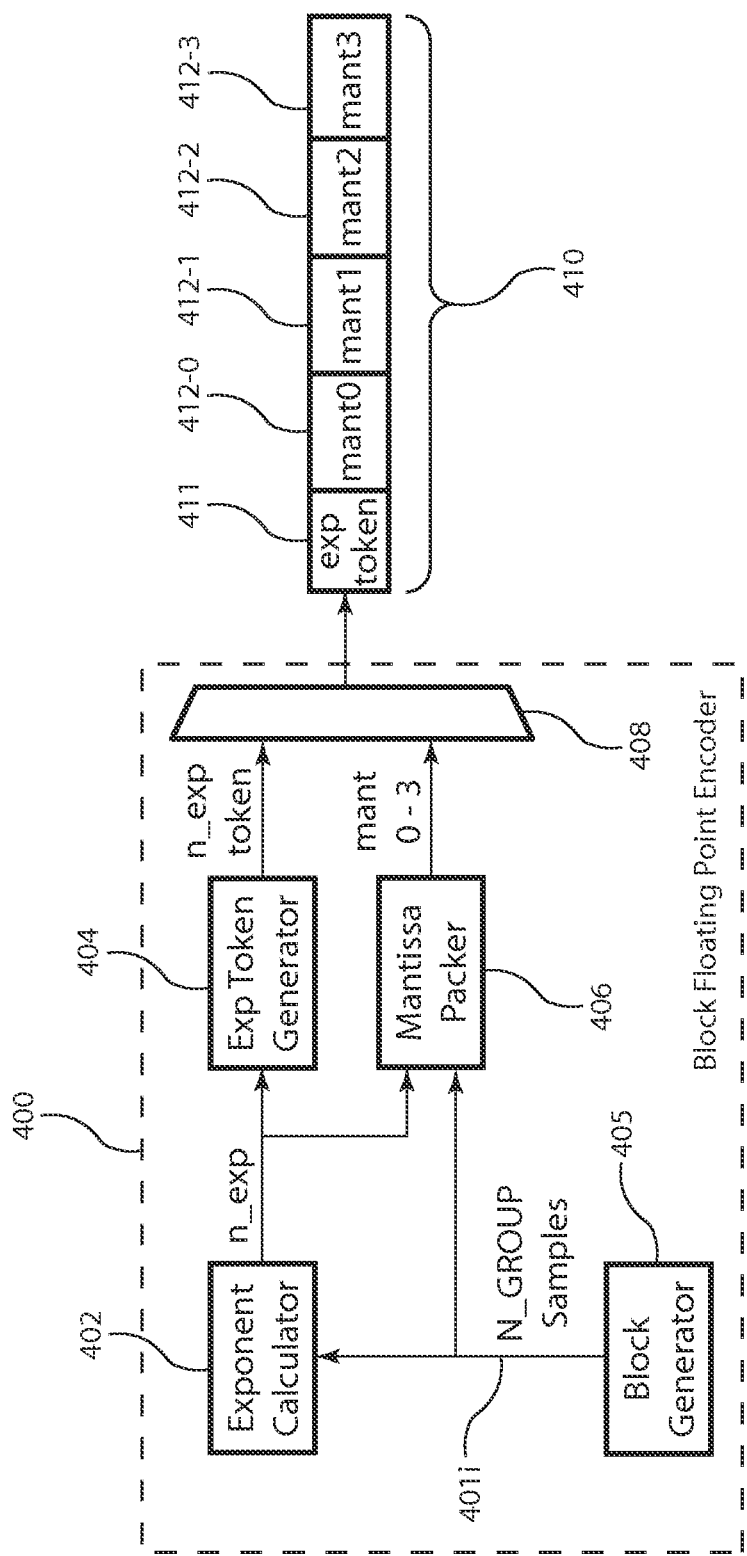
FIG. 11 is a block diagram of an embodiment of the block floating point encoder.

FIG. 11 is a block diagram of an embodiment of the block floating point encoder 400. The block floating point encoder 400 is applied to inputs having an integer format. The integer inputs may be the output of the integer compressor logic 304. Alternatively, the integer inputs may be the output of the float to integer format converter 302, where the integer compressor logic 304 is not used. Aspects of block floating point encoding is described in my copending U.S. patent application Ser. No. 12/605,245, filed 23 Oct. 2009 entitled "Block Floating Point Compression of Signal Data" (now Pub. No.: US 2011/0099295 A1), which is incorporated by reference as if fully set forth herein. In the following description of the BFP encoder 400, "sample" refers to an integer type sample, an "exponent" of an integer sample will refer to the place value of the most significant (or left-most) "1" in the integer's mantissa, or exponent (base 2), and "mantissa" will refer to the integer sample's mantissa. Referring to FIG. 11, the block generator 405 defines blocks of N_GROUP samples 401$i$ to be encoded together. For the N_GROUP samples 401$i$, the maximum exponent is encoded and the N_GROUP mantissas are encoded according to the following steps.

For the first group of N_GROUP samples 401i:
1) Determine the exponent (base 2) for the sample with the maximum magnitude, such as by calculating the $\log_2$ of the maximum magnitude in each group of N_GROUP samples or by determining the number of bits that are not sign extension bits. This indicates the number of bits per encoded sample, or n_exp(0).
2) Absolute encode the exponent n_exp(0) of the first group using S bits, where S is the original number of bits per sample.
3) Encode the N_GROUP samples using n_exp(0) bits per sample.

For the $i^{th}$ group (i>0) of N_GROUP samples 401i:
4) Determine the $i^{th}$ exponent (base 2) for the sample with the maximum magnitude, which indicates the number of bits per encoded sample in the $i^{th}$ group, or n_exp(i);
5) Differentially encode the $i^{th}$ exponent by subtracting n_exp(i) from n_exp (i−1) to determine an $i^{th}$ difference value. Encode the $i^{th}$ difference value using a corresponding token, where shorter tokens represent more common difference values and longer tokens represent less common difference values.
6) Encode the $i^{th}$ group of N_GROUP samples using n_exp (i) bits per sample.

For the first group of samples, the exponent n_exp(0) is directly encoded. For example, the exponent n_exp(0) can be encoded as follows, where S is the original number of bits per sample:
  a. 0: n_exp(0)=0 (all 4 sample values are zero)
  b. 1: n_exp(0)=2 (2 bits per sample)
  c. 2: n_exp(0)=3 (3 bits per sample)
  d. etc. until S−1: n_exp(0)=S (S bits per sample)

For the $i^{th}$ group, the exponent n_exp(i) may be differentially encoded using a prefix code, where no codeword is the prefix of another codeword. An example of differential encoding is as follows:
  1. Calculate difference: e_diff=n_exp(i)−n_exp(i−1)
  2. Encode e_diff as follows:
    a. 0: e_diff=e(i)−e(i−1)
    b. 101: e_diff=+1
    c. 110: e_diff=−1
    d. 1001: e_diff=+2
    e. 1110: e_diff=−2
    f. Etc.

Huffman encoding of the exponent differences assigns tokens of different lengths to the exponent differences based on their frequencies of occurrence. Shorter Huffman tokens may be assigned to the more frequent values of exponent differences. The exponents n_exp(i) may be directly encoded, for example by Huffman encoding, instead of differentially encoded. Alternatives for encoding the block exponents are described below.

Figure 12A:
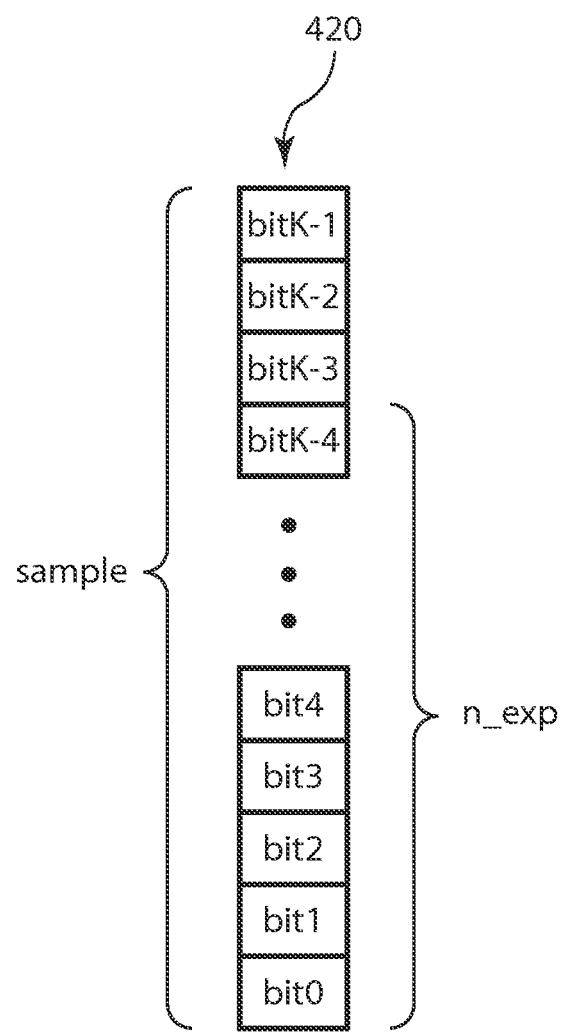
FIG. 12a illustrates an example of selecting n_exp bits for the encoded mantissa.
Figure 12B:
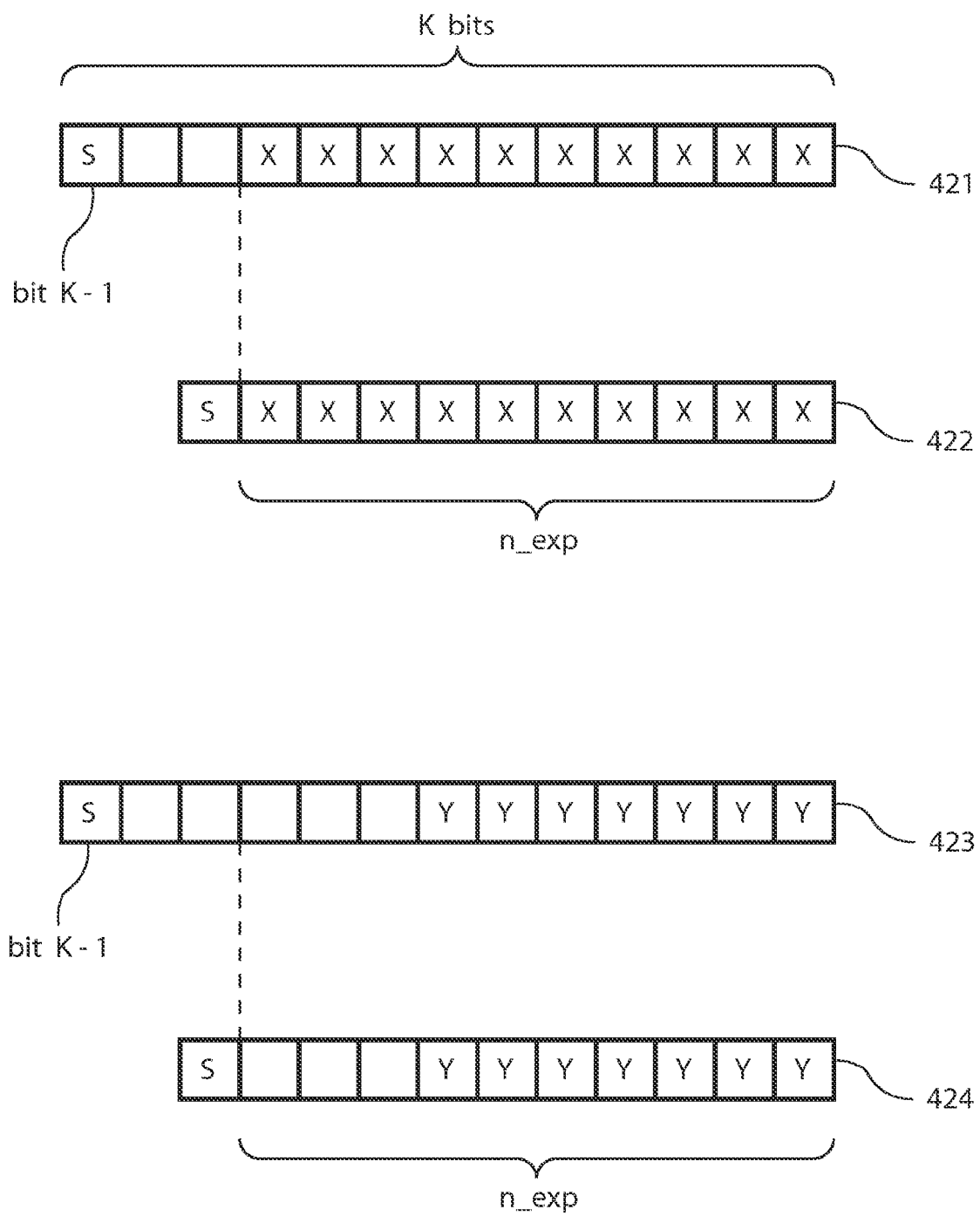
FIG. 12b shows an example of compressing two samples within the same block.

FIG. 11 is an example of the block floating point encoder 400 where N_GROUP=4 samples. The exponent calculator 402 determines the maximum exponent, n_exp, for the N_GROUP samples as in step 1 and step 4. The maximum exponent corresponds to the log base 2 of the sample with the maximum magnitude. The exponent token generator 404 encodes the n_exp values as in step 2 and step 5. The mantissa packer 406 encodes the mantissas for the N_GROUP samples as in step 3 and step 6, producing mantissas having n_exp bits. FIG. 12a illustrates an example of selecting n_exp bits for the encoded mantissa. The integer sample 420 is represented by K bits. The n_exp lower bits of the sample 420 are selected for encoding. The sign bit for the sample is appended to the selected bits and the resulting sequence of bits represents the encoded sample. FIG. 12b shows an example of compressing two samples within the same block. For this example, when samples are represented in a sign-magnitude format, the blank bits are leading zeros. For sign extension representations, the blank bits would be sign extension bits in the mantissa and set to the value of the sign bit S. The maximum magnitude sample 421 of the N_GROUP samples in the block occupies n_exp mantissa bits, indicated by "X". The original number of bits per sample is K, indexed from 0 to K−1 with bit K−1 representing the sign bit "S". The compressed sample 422 represents the n_exp mantissa bits "X", in accordance with steps 3 and 6, along with the sign bit "S". Sample 423 represents another sample in the block of N_GROUP samples occupying the bits indicated by "Y". The compressed sample 424 uses n_exp bits to represent the mantissa bits "Y", in accordance with steps 3 and 6, along with its sign bit "S". The mantissas of the compressed samples 422 and 424 have the same integer values as the corresponding mantissas of the uncompressed samples 421 and 423, however the bit width of each mantissa is reduced. Returning to FIG. 11, the multiplexer 408 may pack the encoded exponent token 411 followed by the set of N_GROUP encoded mantissas along with the sign bits to form the compressed group 410 representing the N_GROUP compressed samples. For this example, the compressed group 410 includes the exponent token 411 followed by the sequence of four packed mantissas (with appended sign bits) 412-0, 412-1, 412-2 and 412-3. The bit packer 500 may concatenate consecutive compressed groups 410 to form the data portion of a compressed packet. Alternatively, the bit packer 500 may arrange a sequence of exponent tokens corresponding to a sequence of groups followed by the corresponding sets of mantissas. The preferred sizes for N_GROUP are three or four samples per group. However, variable group sizes may be used.

Encoding the mantissas and exponents separately can provide additional compression and mitigate compression error. In one embodiment for exponent encoding, two or more exponent difference values are jointly encoded. A statistical analysis of block exponent values for signal data from various applications, including ultrasound, radar and computed tomography raw data showed that 90% of consecutive exponents have differences in the range of {−1, 0, +1} and that 98% of consecutive exponents have differences in the range {−2, −1, 0, +1, and +2}. Jointly encoding two or more successive exponent differences can reduce the number of bits per encoded exponent. An encoding scheme that uses four or eight bits for an exponent token is given in FIG. 13. By using a fixed number of exponent bits, the complexity of both compression and decompression is reduced, when compared to exponent encodings that permit exponent tokens having arbitrary bit lengths. FIG. 13's table lists exponent token values for three encoding options: (A) jointly encoding two successive exponent differences, (B) encoding one exponent difference and (C) absolute (or linear) encoding of one exponent value. The successive exponent differences {diff(i), diff (i−1)} for the joint encoding option (A), given in the third column, have nine different combinations of difference values, in which both the first and the second encoded exponent difference have one of three possible values {−1, 0, +1}. These nine of sixteen combinations in the table may be encoded using exponent tokens having 4 bits each. Since one token encodes the exponents for two blocks, the joint encoding of exponent differences uses 2 bits per block exponent. Encoding of a single exponent difference in the range {−2, −1, 0, +1, +2} and the associated exponent tokens are listed for option (B). This option uses five of the sixteen combinations in the table. Finally, absolute encoding for the exponent value itself, n_exp(i), listed for option (C), uses 8 bits per exponent token. In this embodiment, the top three bits are set to 1's and the bottom five bits encode the exponent. The top three bits set to 1's indicate that the exponent is absolutely encoded, i.e. the exponent itself is sent in the exponent token, rather than the difference between the current exponent and the previous exponent. The five lower bits indicate one absolute exponent in the range {0, 2, 3, ..., 32}, where an exponent value of 1 is not allowed. Using an integer number of nibbles (4-bit units) simplifies exponent encoding and later decoding. Applying the exponent encoding of FIG. 13 to the signal data from the above applications showed the following proportions for the exponent encoding options:

(A) joint encoding option (2 bits/exponent)—80% of the exponents
(B) differential encoding option (4 bits/exponent)—18% of the exponents
(C) linear encoding option (8 bits/exponent)—2% of the exponents The weighted average of the bits/exponent for each of the options indicates that the average number of bits per encoded exponent is about 2.48 bits. Since there are N_GROUP individual samples per encoded exponent, the exponent encoding scheme provides substantial efficiency when compared to alternative exponent encoding techniques, especially those using one exponent per mantissa.

For efficient encoding and decoding of packets, the compressed data for all the samples represented by the packet are contained within the packet. Absolute encoding the first block exponent of the packet makes the first exponent token independent of the previous packet. The final block exponent of the packet may be differentially encoded with the next-to-last block exponent of the packet. The exponent difference corresponding to the last block exponent and the previous block exponent may be jointly encoded with the previous exponent difference within the same packet, but may not be jointly encoded with the first exponent difference of the subsequent packet.

Figure 14:
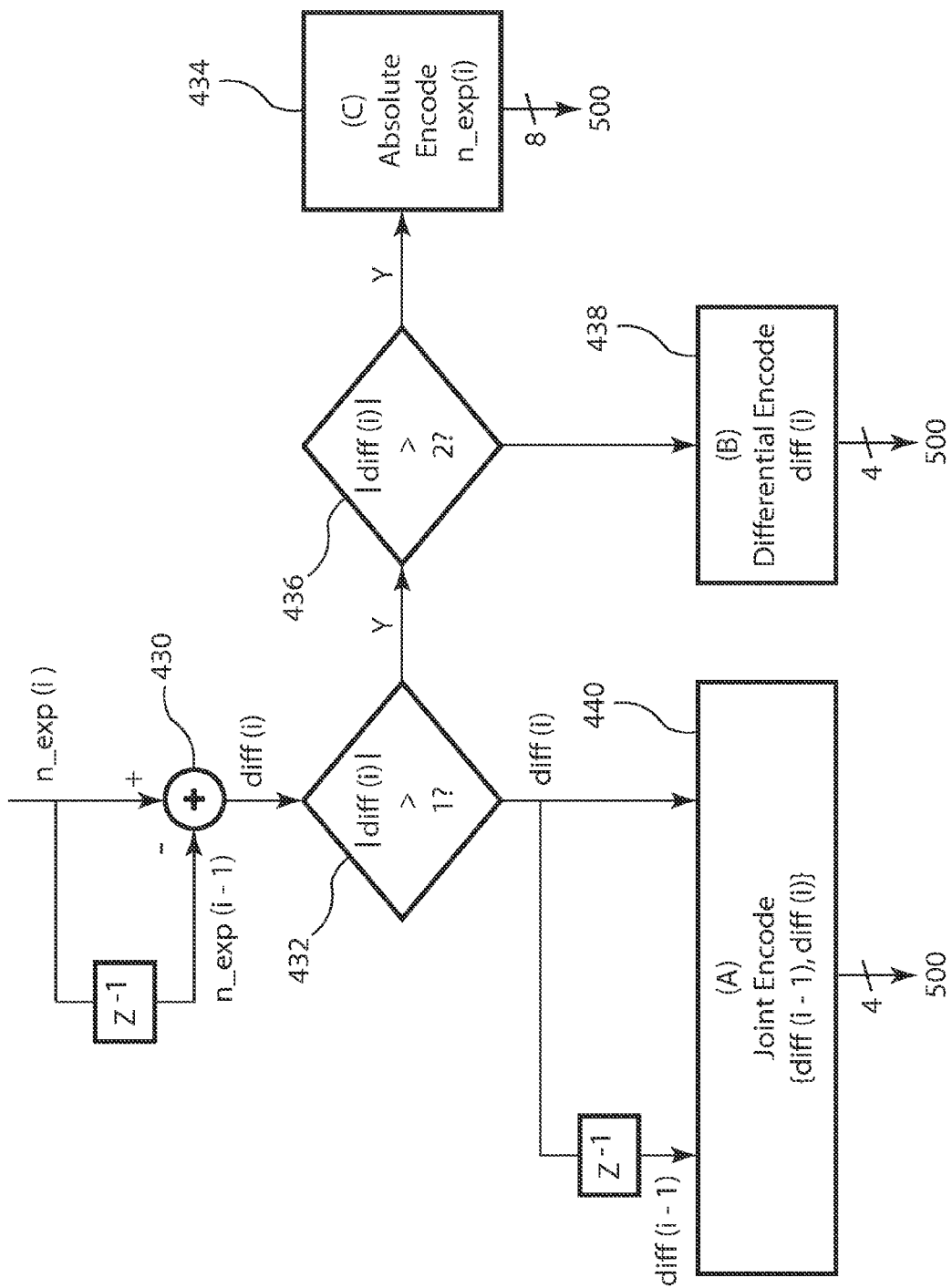
FIG. 14 is a block diagram of exponent encoding for a block of N_GROUP samples.

FIG. 14 is a block diagram of exponent encoding for a block of N_GROUP samples 401i. This block diagram does not include the additional conditions for encoding the first and last block exponents in the packet described above. The subtractor 430 subtracts the block exponent n_exp(i) for the current block from the previous block exponent n_exp(i−1) to form exponent difference diff(i). The decision block 432 tests whether the magnitude of the difference is greater than 1. If both diff(i) and the exponent difference diff(i−1) from the previous iteration are less than or equal to one, then the joint encoder 440 jointly encodes both diff(i) and diff(i−1) as indicated by option (A) in FIG. 13 to form a 4-bit token representing both exponent differences. If diff(i) is greater than 1, then the decision block 436 tests whether the magnitude of the difference is greater than 2. If the magnitude of diff(i) is greater than 2, then the absolute encode block 434 encodes the exponent n_exp(i) as indicated by option (C) in FIG. 13 to form an 8-bit token representing n_exp(i). If not, then the differential encode block 438 encodes diff(i) as indicated by option (B) in FIG. 13 to form a 4-bit token representing the exponent difference diff(i). The exponent token is provided to the bit packer 500.

FIG. 15 gives an example of encoding the exponents of eight blocks of samples to form a single compressed packet. In this example, the first two block exponents are absolutely encoded (option (C)) to have eight bits per token. The exponent differences of blocks 3 through 6 are jointly encoded (option (A)) to form a 4-bit exponent token for blocks 3 and 4 and a 4-bit exponent token for blocks 5 and 6. The exponent differences for blocks 7 and 8 are each differentially encoded to produce one 4-bit exponent token for each block. While the exponent difference for block 7, diff(7)=+1, falls within the range for joint exponent encoding, the exponent difference for block 8, diff(8)=−2, does not. Therefore, diff(7) and diff(8) are each assigned a 4-bit exponent token, 1100 and 1001, respectively.

Figure 16:
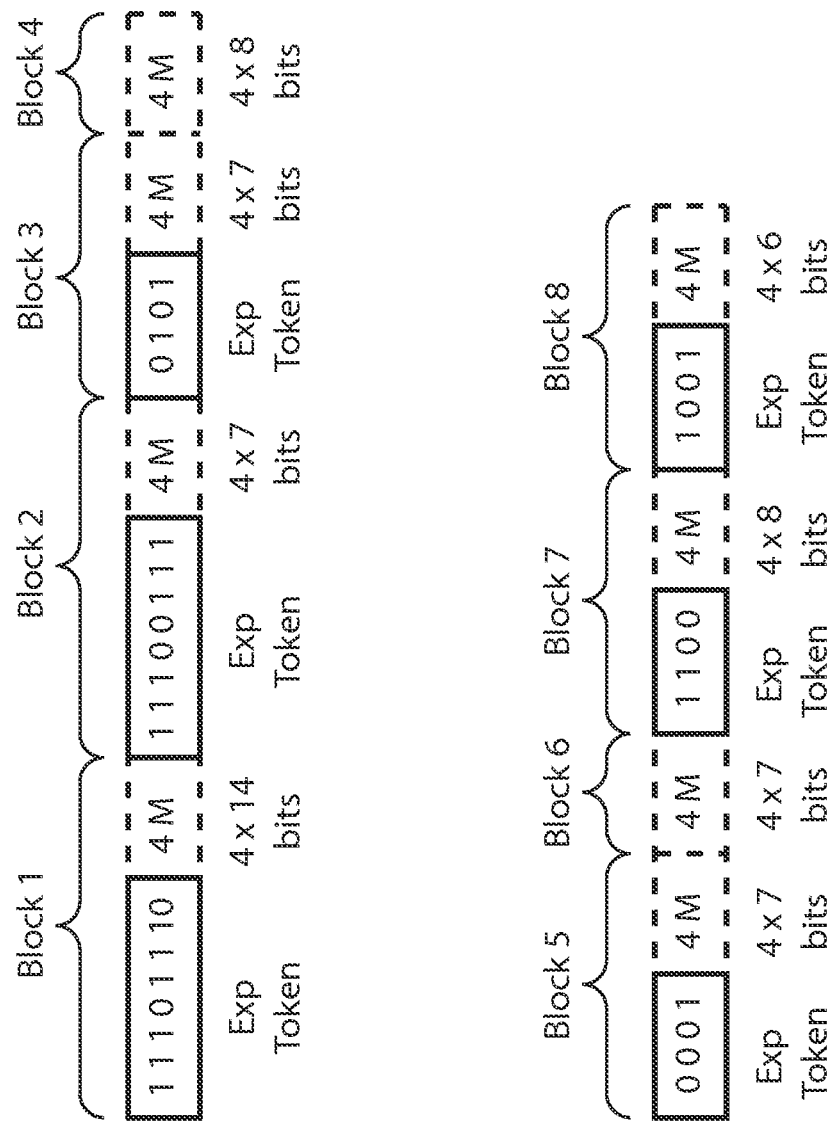
FIG. 16 is a diagram of the data portion of a compressed packet for the compressed blocks of the example of FIG. 15.

FIG. 16 is a diagram of the data portion of a compressed packet for the compressed blocks of the example of FIG. 15. For this example, the bit packer 500 packs one exponent token followed by N_GROUP=4 mantissas. The compressed packet would also include a header, not shown. The packed bits for the four mantissas, including the sign bits, of each block are indicated by "4M" in the diagram and are not shown to scale. The compressed block 1 includes an 8-bit exponent token and the packed bits for four 14-bit mantissas. The compressed block 2 includes an 8-bit exponent token and the packed bits for four 7-bit mantissas. Since the exponent differences for blocks 3 and 4 are jointly encoded, the compressed block 3 includes the 4-bit exponent token and four 7-bit mantissas. The compressed block 4 includes four 8-bit mantissas and no exponent token. Since the exponent differences for blocks 5 and 6 are jointly encoded, the compressed block 5 includes the 4-bit exponent token and four 7-bit mantissas. The compressed block 6 includes four 7-bit mantissas and no exponent token. The compressed block 7 includes the exponent token representing the difference between the exponents corresponding to block 6 and block 7 and four 8-bit mantissas. The compressed block 8 includes the exponent token representing the difference between the exponents corresponding to blocks 7 and 8 and four 6-bit mantissas. For this example, eight blocks are encoded using six exponent tokens.

The bit packer 500 may pack a single exponent token followed by the corresponding signs and mantissas in the compressed packet. The exponent token may correspond to (A) joint encoding of two exponent differences, (B) encoding of one exponent difference, and (C) absolute encoding of one exponent value. The number of mantissas following the exponent token depend on the encoding option (A), (B), or (C). For encoding option (A), the exponent token is followed by 2*N_GROUP mantissas. For encoding options (B) and (C), the exponent token is followed by N_GROUP mantissas, as illustrated in FIG. 16. Alternatively, the bit packer 500 may pack two or more exponent tokens followed by the corresponding mantissas and signs. This alternative may be more efficiently implemented in SIMD (single input, multiple data) architectures.

Figure 17:
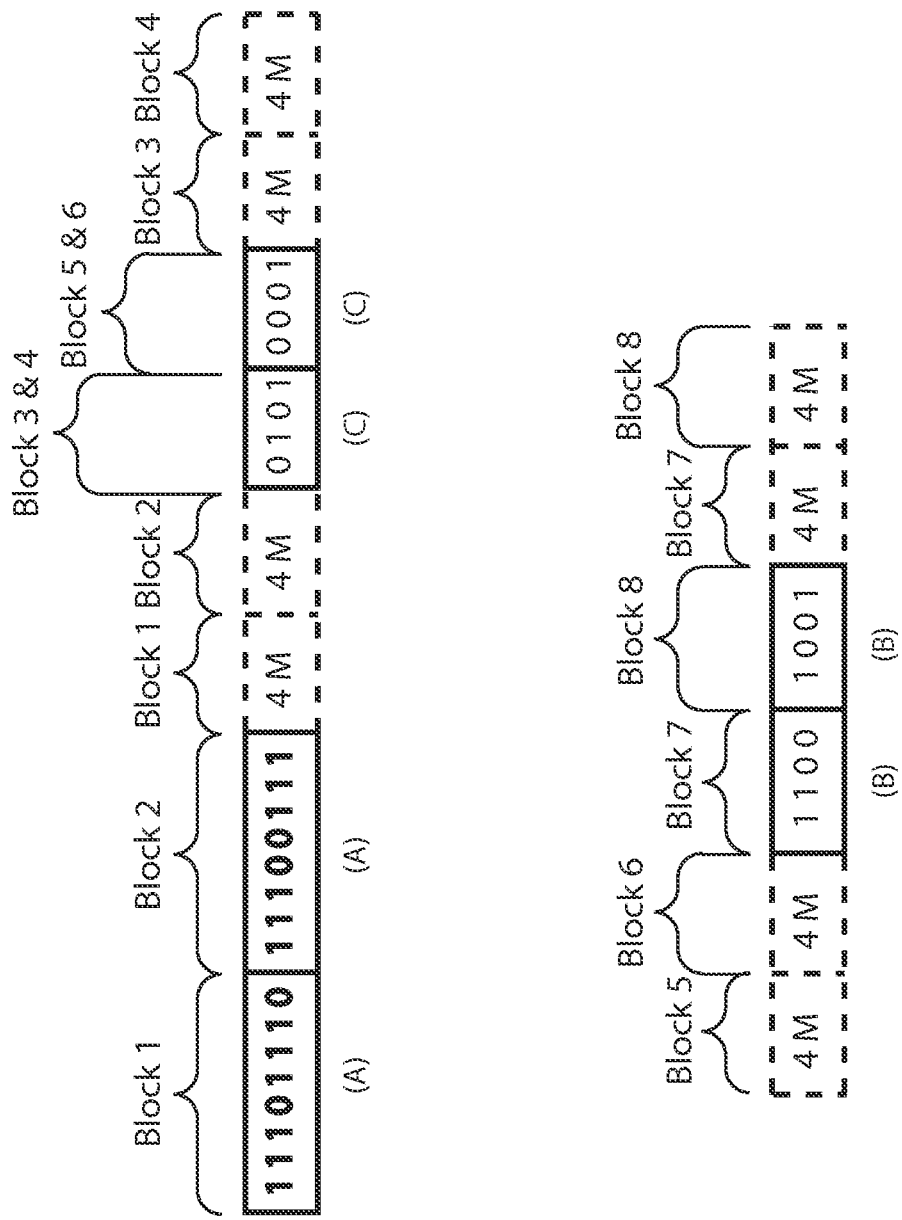
FIG. 17 illustrates the data portion of a compressed packet for the example of FIG. 15.

FIG. 17 illustrates the data portion of a compressed packet for the example of FIG. 15, where the compressed data are arranged as two exponent tokens followed by corresponding mantissas and signs. The two exponent tokens may occupy 16 bits for encoding option (A), 8 bits for encoding options (B) and/or (C), and 12 bits for encoding options (A) for one token and (B) or (C) for the other token. Referring to FIG. 17, for Blocks 1 and 2 using the encoding option (A), the two absolutely encoded exponent tokens are followed by the N_GROUP=4 mantissas and signs. For blocks 3, 4, 5, and 6, the encoding option (C) produces two joint encoded exponent tokens. These are followed by the corresponding four blocks of N_GROUP mantissas and signs. For blocks 7 and 8, the encoding option (B) produces two differentially encoded exponent tokens. These are followed by the corresponding two blocks of N_GROUP mantissas.

Referring to FIGS. 7 and 10, the compression controller 600 provides compression parameters to one or more of the float to integer format converter 302, integer compressor logic 304, the block floating point encoder 400, and the bit packer 500. The compression controller 600 may provide a parameter indicating, for example, whether the data type of the input sample, such as single or double precision, and a parameter indicating whether F_SCALE or EXP_SCALE will be used by to the float to integer format converter 302. The compression parameters used by the integer compressor logic 304 may include an attenuation parameter used by the attenuator 332. Derivative parameters used by the derivative processor 334 may include the derivative order, i.e. first, second, or no derivative, and sample spacing for difference calculations. The compression controller may calculate these parameters to achieve lossless, fixed-rate or fixed-quality of compressed data. The fixed-rate or fixed-quality modes or compression may be lossy. In lossy compression, the decompressed, or reconstructed, signal samples are similar, but not identical to, the original samples. The compression controller may support fixed-rate compression by receiving information on compressed packet size from the bit packer 500 and adjusting the compression parameters to increase or decrease compression, as described in the '533 patent. For the BFP encoder 400, the compression parameters may include the block size parameter N_GROUP. The compression controller 600 can respond to user input to select the compression parameters. The user may select compression parameters that provide a fixed bit rate of compressed data or a fixed quality metric, or level of distortion, of the compressed data.

The bit packer 500 may provide a header section in the compressed data packet. The header section may contain information to be used for decompressing the compressed data, reconstructing the floating point data, converting the compressed data to another format or other information used for processing the data. For example, information for reconstructing the data sequence includes synchronization information, number of samples, number of bits per sample, and data type of the original data. For reconstructing the floating-point numbers, the parameters EXP_SCALE or F_SCALE determined by the float to integer format converter 302 may be included in the header. Compression parameters used by the integer compressor logic 304 may include an attenuation parameter used by the attenuator 332 and derivative parameters used by the derivative processor 334, such as the derivative order, i.e. first, second, or no derivative, and sample spacing for difference calculations. For the BFP encoder 400, the block size parameter N_GROUP may be included in the header. To support decompression, the packet header is decoded to generate the parameters for decoding of the compressed data and, optionally, to re-sequence the decompressed samples.

Figure 18:
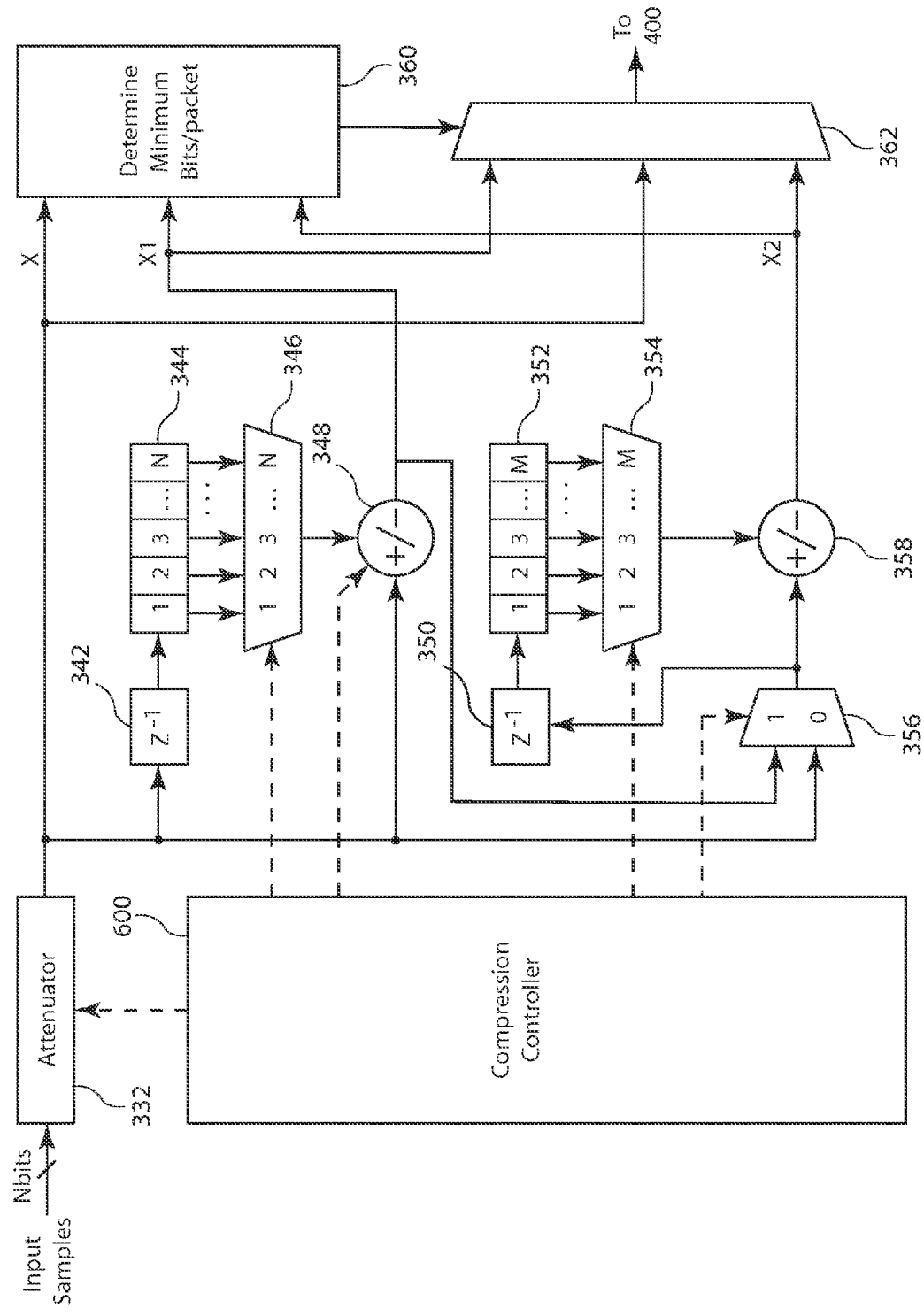
FIG. 18 illustrates an adaptive architecture for the integer compression logic.

FIG. 18 illustrates an adaptive architecture for the integer compressor logic 304. This architecture is configurable to perform sums or differences between samples with selectable sample separations and to determine the sample, sample difference/sum or derivative order providing the minimum bits per packet, or best compression. The attenuator 332 may attenuate the integer sample $x(n)$ by an attenuation factor indicated by the compression controller 600 or no attenuation may be indicated. The attenuator 332 may reduce the magnitude of the integer sample by multiplying by an attenuation factor value less than one or by shifting out a number LSBs (dividing by 2) based on an attenuation factor. Applying the attenuator 332 will result in lossy compression. For the following description, the variable $x(n)$ represents the integer sample with or without attenuation. The FIFO buffer 344 stores N previous samples $x(n-1)$ to $x(n-N)$, where the delay element 342 provides $x(n-1)$. The selector 346 selects a sample $x(n-m)$ with the desired sample separation from the FIFO buffer 344. The add/subtract element 348 computes the sum or difference between the current integer sample $x(n)$ and the selected sample $x(n-m)$ to form a first result $x1(n)$. If add/subtract element 348 is set to subtract, the result $x1(n)$ represents a first derivative. When the sample spacing index $m=1$, the result $x1(n)$ is the first derivative of adjacent samples. When the third selector 356 is set to "1", the first result $x1(n)$ is delayed by a second delay element 350 to form $x1(n-1)$ and provided to a second FIFO buffer 352. The second FIFO buffer 352 may store up to M samples of x1 from $x1(n-1)$ to $x1(n-M)$. The second selector 354 selects a sample $x1(n-p)$ from the second FIFO buffer 352 for input to the second adder/subtractor 358. The third selector 356 provides the other input to the adder/subtractor 358. When the third selector 356 is set to "1", the sample $x1(n)$ is input to the second adder/subtractor 358. When the second adder/subtractor 358 is configured to subtract, the result is the second derivative $x2(n)=x1(n)-x2(n-p)$. When the sample spacing indices $m=1$ and $p=1$, the resulting $x2(n)$ is the second derivative over adjacent samples. The fourth selector 362 may select the alternative using the fewest bits for the previous packet and provide the respective sample $x(n)$, $x1(n)$ or $x2(n)$ to the block floating point encoder 400. The FIFO buffers 344 and 352 store N and M samples, respectively. The sizes N and M may be set to accommodate compression calculations for a range of data formats.

The block 360 includes logic to determine which of alternatives $x(n)$, $x1(n)$ or $x2(n)$ for the current packet would produce the least number of bits, or most compression, for a compressed packet. A selection parameter corresponding to the alternative with the most compression is provided to the fourth selector 362 and stored in the packet header of the next packet. The selector 362 applies the selection parameter to samples for the next packet. Determining the selection for the next packet based on the current packet data reduces the latency of compression processing. Alternatively, the selection parameter may be based on the current packet data and stored in the current compressed packet, if the latency to determine the minimum bits per packet is tolerable. Alternatively, the selection of $x(n)$, $x1(n)$ or $x2(n)$ may be made during a training period and fixed for subsequent packets. Alternatively, the selector 362 may use a manually-set selection parameter received from the compression controller 600.

When the compression processing uses the block floating point encoder 400, the logic block 360 may determine which of the alternatives $x(n)$, $x1(n)$ and $x2(n)$ produces the most compression as follows:

1) For each $i^{th}$ block of N_GROUP samples for a packet, determine the maximum exponent (base 2), or n_exp(i) for each alternative $x(n)$, $x1(n)$ and $x2(n)$,
2) Sum the n_exp(i) for all the blocks for a packet to form a total for each alternative, and
3) Select the alternative corresponding to the lowest total.

While the above may not explicitly calculate the exact number of bits per compressed packet for each alternative, the alternative producing the best compression is indicated by the lowest total. Alternatively, the maximum magnitude sample, max(i), in each block N_GROUP samples for each alternative can be substituted for n_exp(i).

The adaptive compressor supports compression of multidimensional data structures or multiplexed data structures. Certain parameter settings for the components in FIG. 18 are appropriate for compression for two-dimensional (2D) data, such as image samples. For example, let N equal the number of samples representing a row of a 2D data set (or an image) so that a sequence of the integer samples $x(n)$ represents row-ordered samples of two or more rows of the 2D data set, where $x(0)$ to $x(N-1)$ is the first row, $x(N)$ to $x(2N-1)$ is the second row, etc. When the first selector 346 is set to select x(N) and the first adder/subtractor 348 is configured to subtract, the resulting x1(n)=x(n)−x(n−N) is the difference between corresponding samples in adjacent rows. When the second selector 354 is set to select "1", the third selector 356 is set to select "0", and the second adder/subtractor 358 is configured to subtract, the resulting x2(n)=x(n)−x(n−1) is the sample difference within the same row. The fourth selector 362 would select the input sample x(n), the row difference sample x1(n), or the sample difference x2(n) for block floating point encoding.

For multiplexed data, a sequence of samples x(n) may represent multiple channels of data, such as data from multiple sensors, multiplexed together to form the sequence. For example, N may represent the number of multiplexed channels, where x(n) to x(n−N+1) represent one sample from each channel at a given time instant and x(n−N) represents two temporally consecutive samples from the same channel. When the first selector 346 is set to select x(n−N) and the first adder/subtractor 348 is configured to subtract, the resulting x1(n)=x(n)−x(n−N) is the difference between temporally consecutive samples from the same data channel. When the second selector 354 selects samples from a second channel offset from the first channel and the second adder/subtractor 358 is configured to subtract, the difference x2(n)=x(n)−x(n−p) is the difference between two different channels at a given time instant. The difference between channel data may provide compression when the different channels are correlated. The selector 362 would select the input sample x(n), the intra-channel difference x1(n), or the inter-channel difference x2(n) for block floating point encoding.

The adaptive compressor supports compression of data having different center frequencies. As described in the '533 patent, the sample separations and the addition or subtraction operations may be selected to optimally compress the samples based on their center frequency. The preprocessor 330 may include a center frequency detector to determine the center frequency. Techniques for center frequency detection are described in the '533 patent. FIG. 19 shows a table of parameter settings as a function of the center frequency. The center frequency is indicated as a fraction of the sample rate SR. The sample separation parameter may be used by selectors 346 and 354. The selection parameter for the third selector 356 is set to "1" for calculating second order derivatives. The add/subtract configurations apply to both adder/subtractors 348 and 358. The selection of addition or subtraction is related to the positive or negative correlation of the samples separated by the sample separation parameter corresponding to the center frequency.

The fourth selector 362 makes selections of x(n) or x1(n) to initialize the data for the compressed packet. For initialization, the fourth selector 362 may select the sample x(n) for absolute encoding as the initial sample of the compressed packet. Thus, when the first derivatives or differences x1(n) are to be encoded for a particular compressed packet, at least the initial sample for the packet will be the absolutely encoded x(n). When the second derivatives x2(n) are to be encoded for a particular compressed packet, the fourth selector 362 may select the sample x(n) for the initial sample and the first derivative x1(n) for the second sample of the compressed packet. This initialization may be performed at least once per compressed packet.

The compression controller 600 may provide the parameters for the components of the adaptive compressor architecture, including an attenuation factor for the attenuator 332, the sample separation parameter for the selectors 346 and 354, add/subtract selection parameter for the adder/subtractors 348 and 358 and selection parameter for the third selector 356. The compression controller may store configuration parameters corresponding to multiple data structures in memory. When a particular data structure is to be compressed, the compression controller 600 may retrieve the appropriate parameters and provide them to the corresponding components of the adaptive compressor. Data structure information may include, for example, multidimensional data parameters or multiplexed data parameters. The compression controller may receive information on center frequency, for example, from the preprocessor 330, and select the corresponding parameters for the components of the adaptive compressor, as described with respect to FIG. 19.

Figure 20:
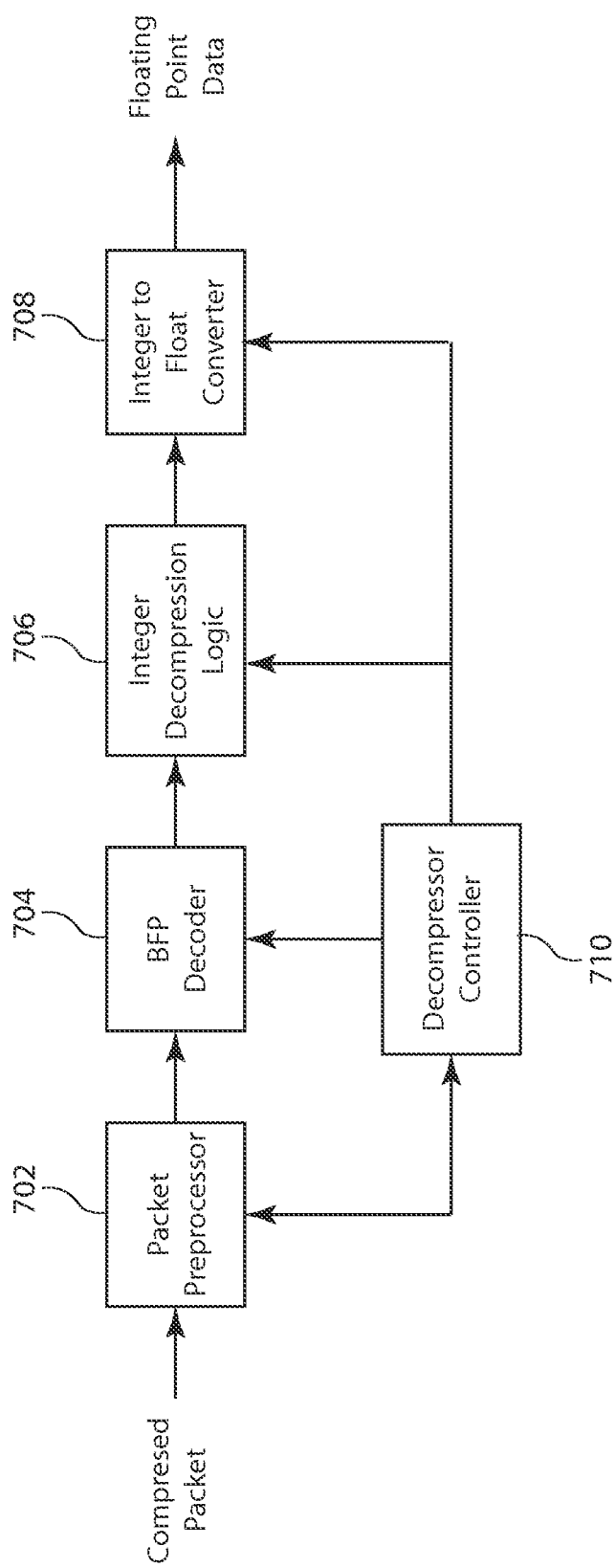
FIG. 20 is a block diagram of exemplary components for decompression of the compressed data and reconstruction of the floating point data.

FIG. 20 is a block diagram of exemplary components for decompression of the compressed data and reconstruction of the floating point data. The packet preprocessor 702 separates the header and data portion of each compressed packet. The compressed data blocks in data portion are provided to the BFP decoder 704. The packet preprocessor 702 decodes the encoded parameters in the header and provides them to the decompression controller 710. The BFP decoder 704 decodes the exponent tokens and corresponding mantissas of the compressed groups of the packet in accordance with the decoded compression parameters to form N_GROUP decoded integer samples corresponding to each compressed group. The integer decompression logic 706 performs the inverse operation of the integer compressor logic 304 to produce decompressed integer samples. For example, when the integer compressor logic 304 includes the derivative processor 334 to calculate first or higher order derivatives prior to block floating point encoding, the integer decompression logic 706 would calculate the first or higher order integrals of the decoded samples to reconstruct integer samples. For another example, when the integer compressor logic 304 includes the attenuator 332, the integer decompression logic 706 would multiply the integer samples by a gain factor that is an approximate inverse of the attenuation factor. When reconstructed floating-point numbers are desired, the integer to float format converter 708 is applied to the decompressed integer samples. Alternatively, the integer samples may remain in the integer format or converted to another data format for the application processing. The decompression controller 710 may provide parameters to configure the operations of the BFP decoder 704, the integer decompression logic 706, and the integer to float format converter 708. For example, the decompression controller 710 may provide the N_GROUP parameter extracted from the packet header to the BFP encoder 704. When the integer decompression logic 706 includes calculating first or higher order integrals and/or multiplying by a gain factor, parameters indicating the integral order, sample separation and gain factor may be provided by the compression controller. For the integer to float format converter 708, the decompression controller 710 may provide the F_SCALE or EXP_SCALE parameter. The decompression controller 710 may determine the parameters based on information from the compressed packet header.

Figure 21:
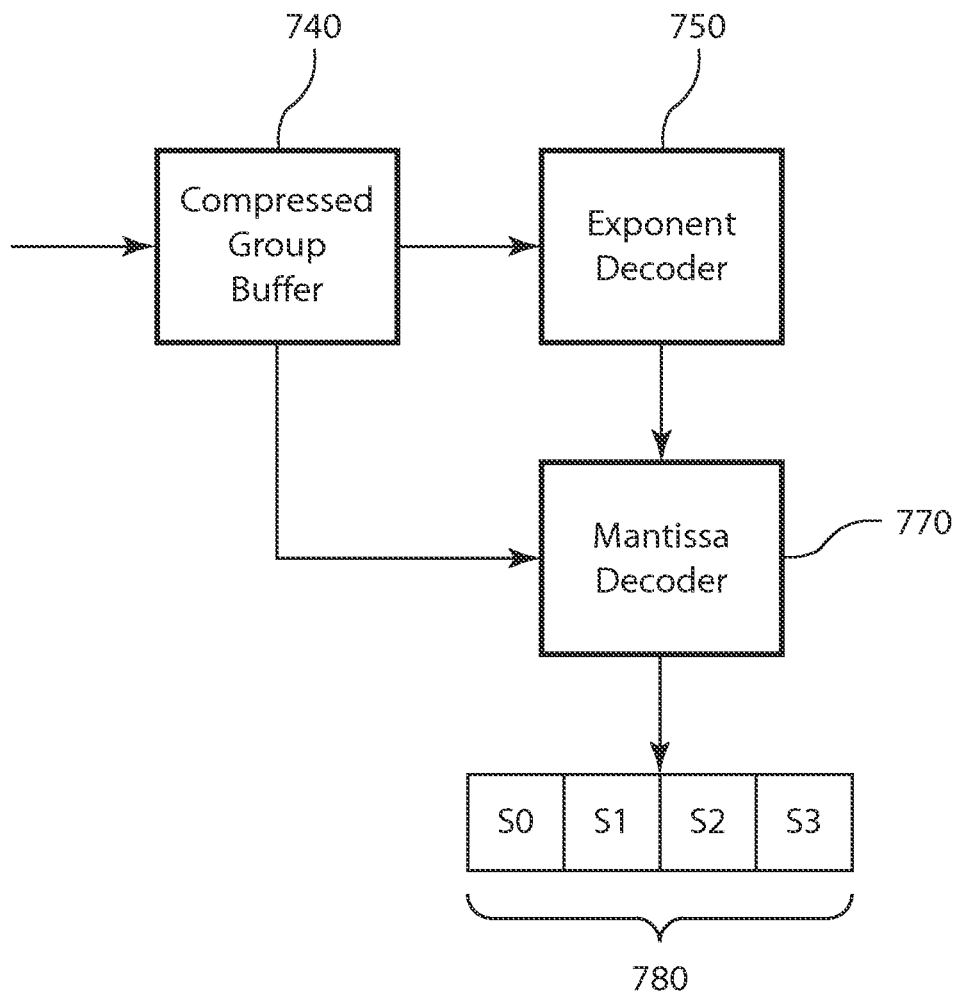
FIG. 21 is a block diagram of block floating point decoder operations for decoding one or more compressed groups.

FIG. 21 is a block diagram of block floating point decoder 704 operations for decoding one or more compressed groups. The compressed group buffer 740 receives the exponent token and mantissas for N_GROUP compressed samples corresponding to the compressed group 410 in FIG. 11. The exponent decoder 750 decodes the exponent token using the code table of FIG. 13 to provide the exponent value n_exp, as described below. The exponent value n_exp indicates the number of bits representing each of the N_GROUP mantissas. The mantissa decoder 770 maps each mantissa to a sample having the appropriate number of higher order bits (typically sign extension bits) and lower order bits to restore the sample representation to the original number of bits or other number of bits to comply with the data format of the destination processor. The mantissa decoder 770 produces the decompressed group 780, where the decoded samples S0 to S3 correspond to the packed mantissas 412-0 to 412-3 in FIG. 11.

Figure 22:
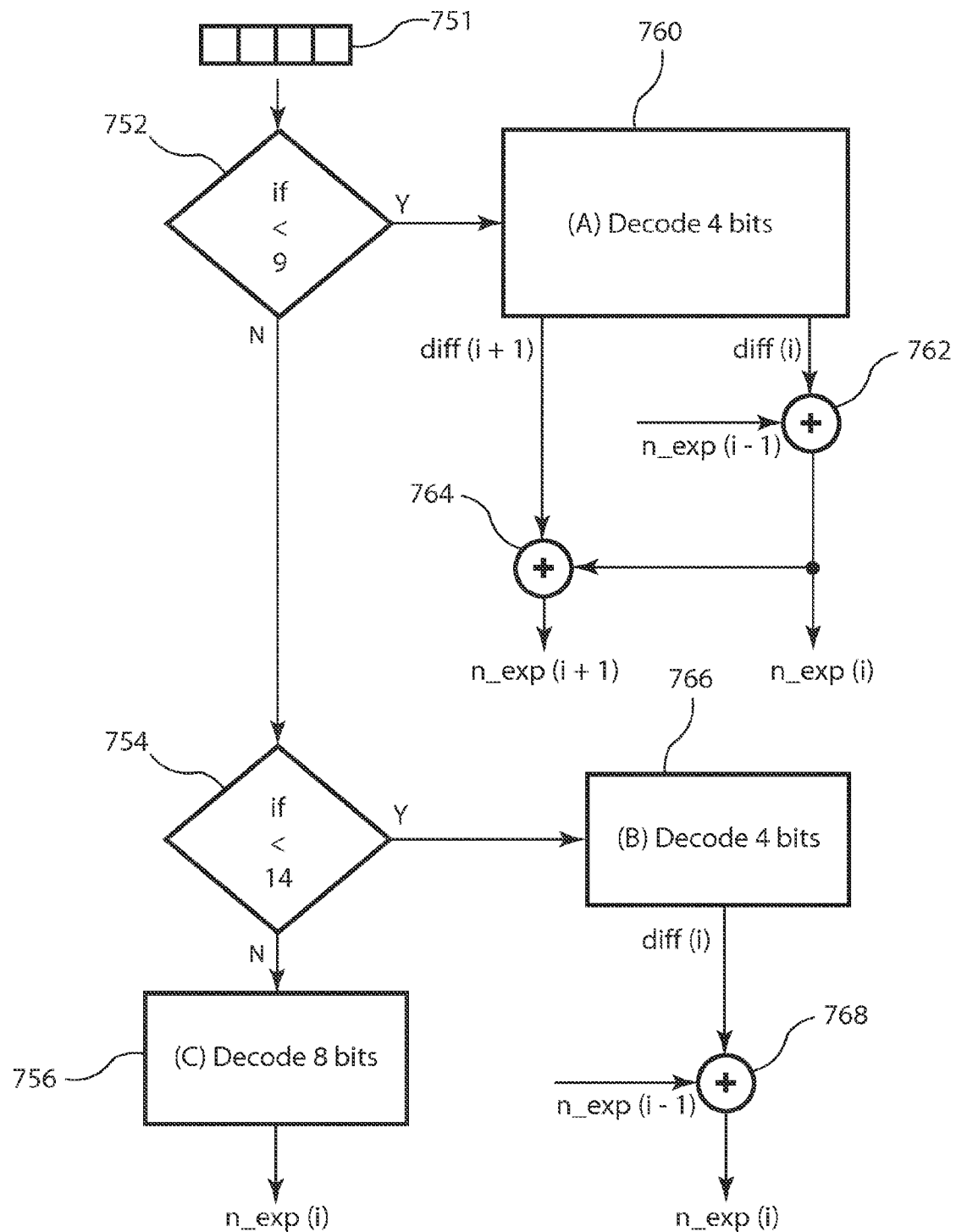
FIG. 22 is a block diagram of the exponent decoder in accordance with the code table of FIG. 13.

FIG. 22 is a block diagram of the exponent decoder 750 in accordance with the code table of FIG. 13. For this embodiment, the exponent decoder 750 applies tests to determine if the exponent token represents jointly encoded exponent differences (option A), a single encoded exponent difference (option B) or an absolutely encoded exponent (option C) for exponent tokens encoded as described with respect to FIG. 15. The exponent decoder 750 tests the lower four bits of the exponent token 501. The decision block 752 tests if the value of the lower four bits of the exponent token 751 is less than 9. If so, the exponent token 501 represents jointly encoded exponent differences in accordance with option A. The decode block 760 decodes the four bits of the exponent token 751 to determine the consecutive difference values diff(i) and diff(i+1). These are used to calculate the consecutive exponent values n_exp(i) and n_exp(i+1). The adder 762 adds the diff(i) to the previously calculated exponent value n_exp(i−1) to compute the $i^{th}$ exponent value n_exp(i). The adder 764 adds the difference value diff(i+1) to the $i^{th}$ exponent value n_exp(i) to compute n_exp(i+1). The decision block 754 tests if the lower four bits of the exponent token 751 are less than 14. If so, the exponent token 501 represents an encoded exponent difference in accordance with option B. The decode block 766 decodes the four bits to determine the difference value diff(i). The adder 768 adds the difference value diff(i) to the previously calculated exponent value n_exp(i−1) to determine the $i^{th}$ exponent value n_exp(i). If results of the decision blocks 752 and 754 were negative for the lower four bits of the exponent token 751, then the exponent token has four additional bits for a total of eight bits and represents an absolute encoded exponent in accordance with option C. The decode block 756 decodes the 8-bit exponent token to determine the exponent value n_exp(i)

Figure 23:
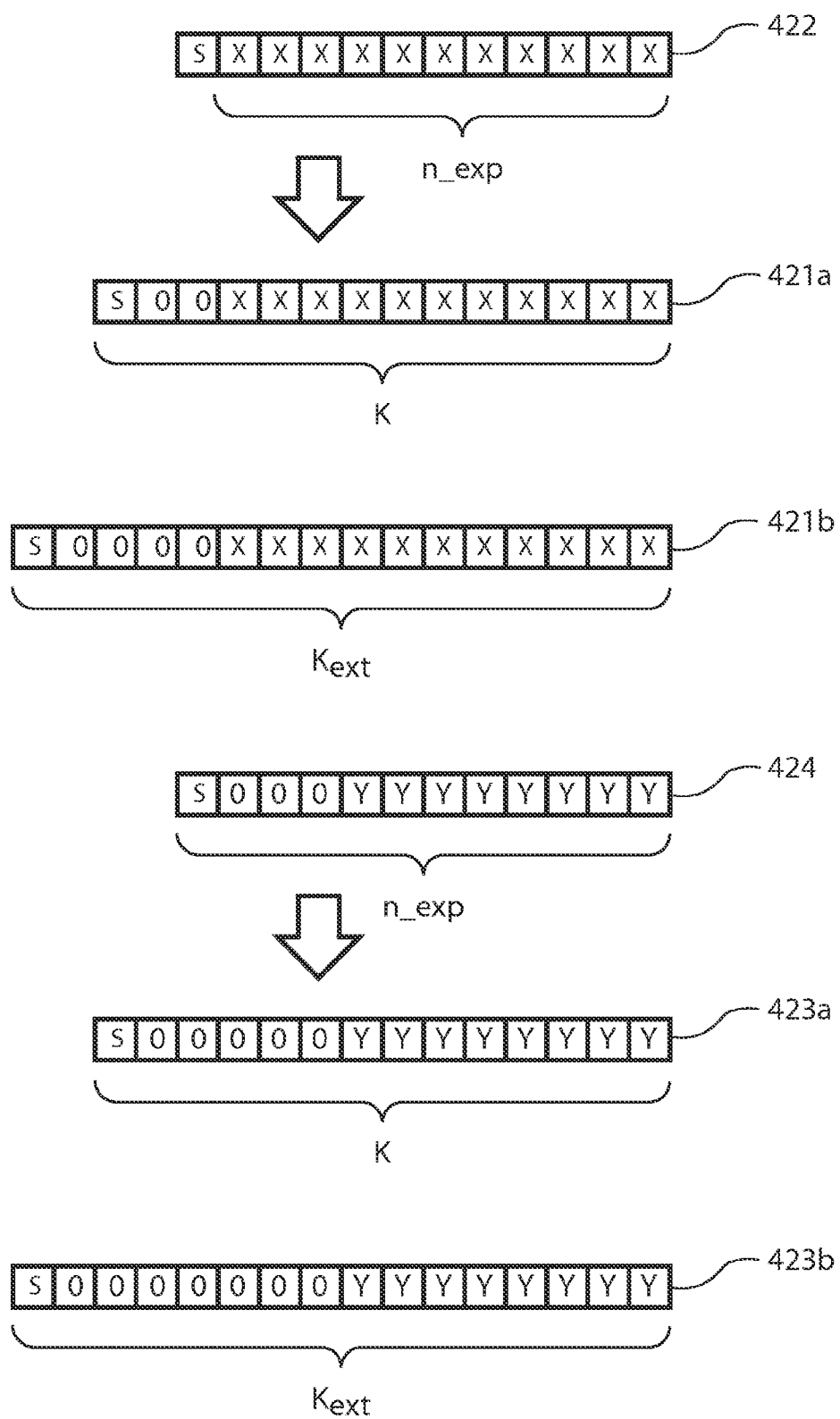
FIG. 23 is an example of decompressing the compressed samples described with respect to FIG. 12b.

FIG. 23 is an example of decompressing the compressed samples described with respect to FIG. 12b. The mantissa decoder 770 uses the exponent value n_exp to identify the mantissa bits and sign bit of each of the compressed samples 422 and 424. The mantissa decoder 770 maps n_exp mantissa bits and the sign bit to the respective decompressed samples 421a and 423a, each having the original number of bits K. Alternatively, the mantissa decoder 770 may map the mantissas to a different bit width than that of the original samples to form decoded samples 421b and 423b, respectively, each having an extended number of bits $K_{ext}$. In this example, the higher order bits in the decoded samples 421a, 421b, 423a and 423b are set to zeros, corresponding to a sign-magnitude representation. Alternatively, one or more of the higher order mantissa bits may be set to the value of the sign bit S for sign extension bits. For decoding of the mantissas, each reconstructed mantissa value is restricted so that it does not change the value of the corresponding exponent of the decoded sample. For a decoded exponent of n_exp, the reconstructed mantissa can have a maximum value of $2^{n\_exp}-1$. This prevents compression error in the mantissa from changing the value of the exponent.

The decoded samples output from the BFP decoder 704 may comprise the decompressed integer samples, or alternatively, additional decompression operations by the integer decompression logic 706 may be applied as indicated by compression parameters in the compressed data packet header. The compression parameters extracted from the compressed data packet and provided to the decompression controller 710 will indicate further decompression operations corresponding to the compression operations applied to the compressed samples in the packet. The integer decompression logic 706 performs the inverse operation of the integer compressor logic 304 in accordance with the compression parameters received from the decompression controller 710. For example, the integer decompression logic 706 may calculate the first or higher order integrals of the decoded samples received from the BFP decoder 704 in response to a derivative order parameter included with the compression parameters. For another example, the integer decompression logic 706 may multiply the integer samples by a gain factor based on a compression parameter.

Figure 24:
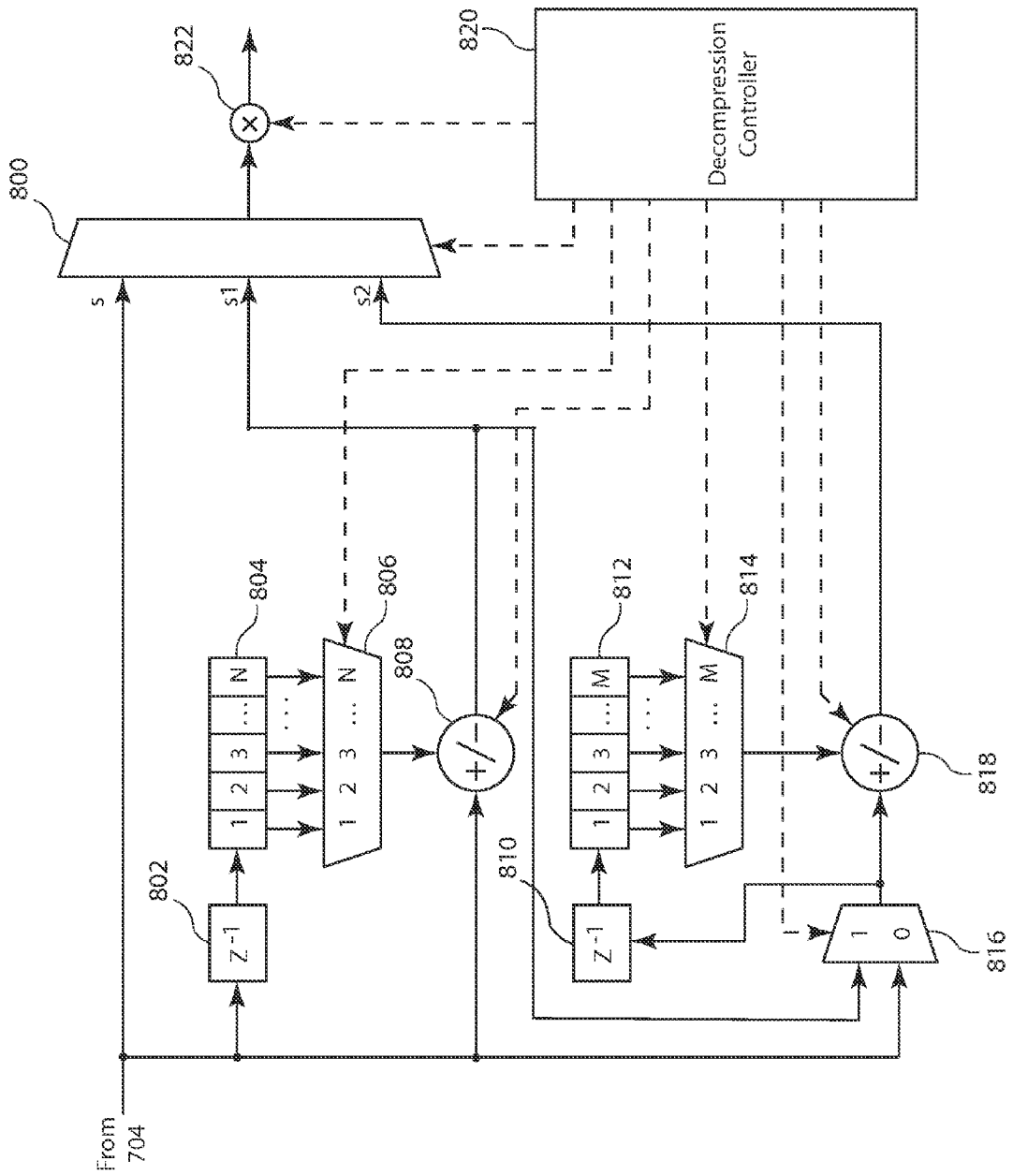
FIG. 24 illustrates an adaptive architecture for the integer decompression logic.

FIG. 24 illustrates an adaptive architecture for the integer decompression logic 706. The adaptive decompressor performs sums or differences between decoded samples separated by selectable sample spacings to invert the compression operations. For the following description, the variable s(n) represents a decoded sample output from the BFP decoder 704. The FIFO buffer 804 stores N previous samples s(n−1) to s(n−N), where the delay element 802 provides s(n−1). The selector 806 selects a sample s(n−m) with the desired sample separation from the FIFO buffer 804. The add/subtract element 808 computes the sum or difference between the current decoded sample s(n) and the selected sample s(n−m) to form a first result s1(n). If add/subtract element 808 is configured to add, the result s1(n) represents a first integral s1(n)=s(n)+s(n−m). When the sample spacing index m=1, the result s1(n) is the first integral of adjacent decoded samples. When the third selector 816 is set to "1", the first result s1(n) is delayed by a second delay element 810 to form s1(n−1) and provided to a second FIFO buffer 812. The second FIFO buffer 812 may store up to M samples of s1 from s1(n−1) to s1(n−M). The second selector 814 selects a sample s1(n−p) from the second FIFO buffer 812 for input to the second adder/subtractor 818. The third selector 816 provides the other input to the adder/subtractor 818. When the third selector 816 is set to "1", the sample s1(n) is input to the second adder/subtractor 818. When the second adder/subtractor 818 is configured to add, the result is the second integral s2(n)=s1(n)+s1(n−p). When the sample spacing indices m=1 and p=1, the resulting s2(n) is the second integral over adjacent decoded samples. The fourth selector 800 selects the sample s(n), s1(n) or s2(n) indicated by the corresponding decompression parameter and provides the selected sample to the multiplier 822. The multiplier 822 multiplies the selected sample by a gain factor to invert the attenuation factor applied by attenuator 332. Since applying the attenuator 332 produced lossy compression, multiplication by the gain factor will produce an approximation of original sample value. If attenuation was not applied during compression, the gain factor is set to "1" or the multiplier is bypassed. The decompression controller 820 may determine the gain factor based on attenuation information extracted from the compressed packet header. The FIFO buffers 804 and 812 store N and M samples, respectively, to accommodate different data structures, as described above for the integer compressor logic 304.

The adaptive decompressor architecture supports decompression of multidimensional data structures or multiplexed data structures using parameter settings described with respect to the adaptive compressor architecture of FIG. 18. For the 2D data set example, where N equals the number of samples representing a row of a 2D data set (or an image), the first selector 806 is set to select s(N) and the first adder/subtractor 808 is configured to add, the resulting s1(n)=s(n)+ s(n−N) sums the decoded samples to reverse the difference operation of adjacent rows performed for compression. When the second selector 814 is set to select "1", the third selector 816 is set to select "0", and the second adder/subtractor 818 is configured to add, the resulting s1(n)=s(n)+s(n−1) sums decoded samples to reverse the difference operation of samples within the same row performed for compression. For the multiplexed data example described above, N represents the number of multiplexed channels. When the first selector 806 is set to select s(n−N) and the first adder/subtractor 808 is configured to add, the resulting s1(n)=s(n)+s(n−N) reverses the difference between temporally consecutive samples from the same data channel performed for compression. When the second selector 814 selects samples from the second channel offset from the first channel and the second adder/subtractor 818 is configured to add, the difference s2(n)=s(n)+s(n−p) reverses the difference between two different channels performed for compression. The fourth selector 800 selects from s(n), s1(n) or s2(n) based on the compression parameter from the compressed packet header.

The adaptive decompressor architecture supports decompression of data having different center frequencies. The selectors 806 and 814 select sample spacing and the addition or subtraction operations to reverse the operations performed by the adaptive compressor the samples based on their center frequency. The selection parameter for the third selector 816 is set to "1" for calculating second order integrals. The configurations of the adder/subtractors 808 and 818 reverse the operations of the adder/subtractors 348 and 358.

The fourth selector 800 makes selections of s(n) or s1(n) corresponding to the initialized data of the compressed packet. When the first derivatives or differences x1(n) were encoded for a particular compressed packet, at least the initial sample for the packet will be absolutely encoded. For the initial decoded sample from the compressed packet, the fourth selector 800 may select s(n) as the initial sample. The fourth selector 800 would select the first integral s1(n) for the remaining decoded samples from the compressed packet. When the second derivatives x2(n) were encoded for a particular compressed packet, the fourth selector 800 may select the sample s(n) for the initial sample and the first integral s1(n) for the second sample, and the second integral s2(n) for the remaining decoded samples from the compressed packet. This initialization may be performed at least once for decoded samples from a compressed packet, depending on the initialization performed during compression.

The decompression controller 820 may provide the decompression parameters for the components of the adaptive decompressor, including the gain factor for the multiplier 822, the sample separation parameters for the selectors 806 and 814, add/subtract configuration parameters for the adder/subtractors 808 and 818 and selection parameters for the selectors 816 and 800. The decompression controller 820 may determine the decompression parameters based on the compression parameters from the compressed data packet header.

The integer to float format converter 708 may be applied to the decompressed integer samples output from the integer decompression logic 706 or the BFP decoder 704 to reconstruct the floating-point data. A first alternative for integer to float format converter 708 corresponds to the float to integer format converter 302 that uses the F_SCALE factor, described with respect to FIG. 8. This integer to float format conversion implements the following:

$$fp\_samp = int\_samp / F\_SCALE \quad (3)$$

where, "fp_samp" indicates the reconstructed floating-point sample and "int_samp" indicates the decompressed integer sample output from the BFP decoder 704 or the integer decompression logic 706.

Figure 25:
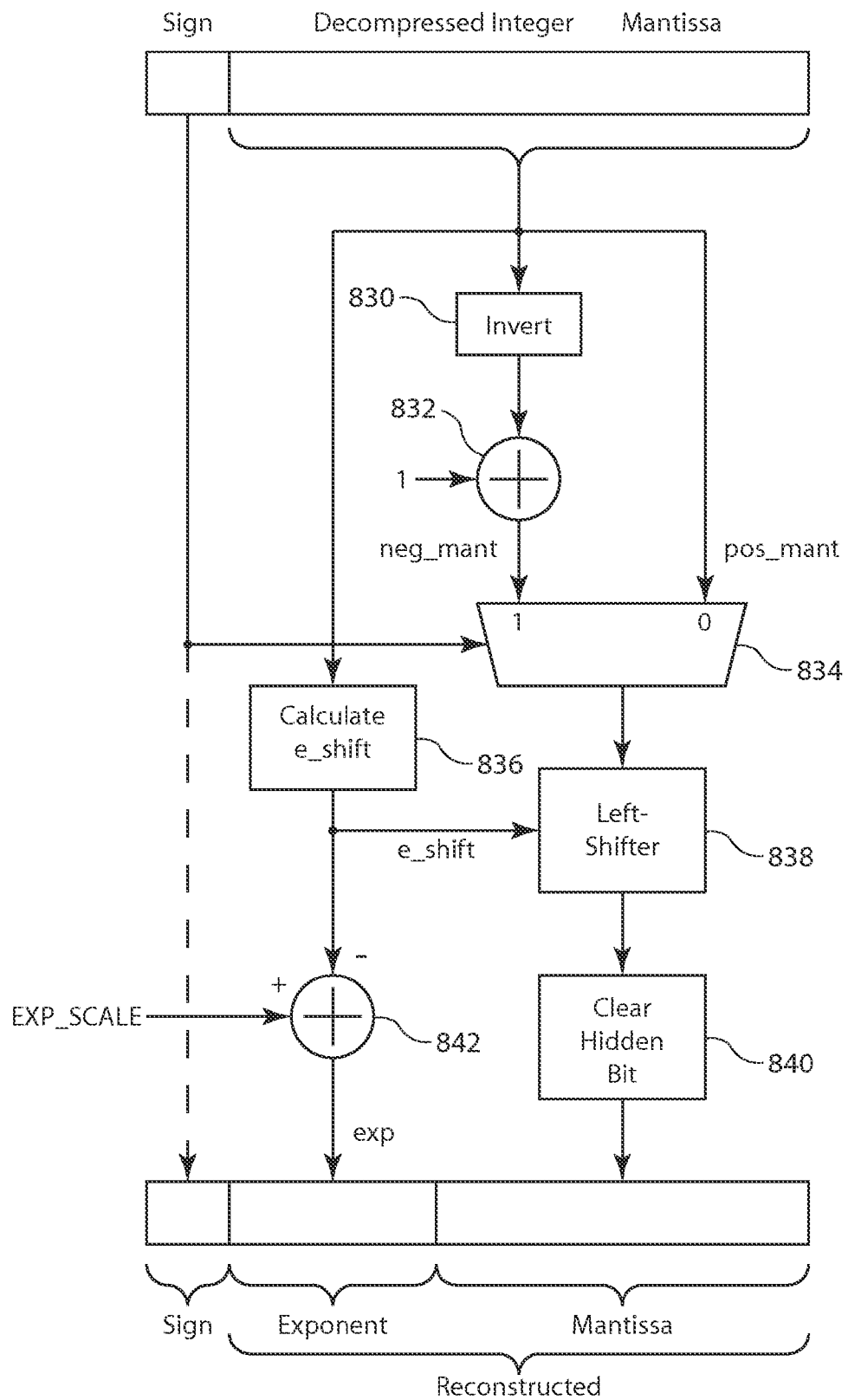
FIG. 25 is a block diagram of an integer to float format converter 708 in accordance with an alternative embodiment.

FIG. 25 is a block diagram of an integer to float format converter 708 in accordance with an alternative embodiment, corresponding to the float to integer format conversion described with respect to FIG. 9. Each input sample comprises the sign and the decompressed integer mantissa in a two's-complement format. The inverter 830 is applied to the decompressed integer mantissa and the adder 832 adds "1" to the inverted mantissa to produce the mantissa, neg_mant, for a negative number. The decompressed integer mantissa provides the mantissa, pos_mant, for a positive number. The selector 834 responds to the sign value to select pos_mant if the sign value is "0" or neg_mant if the sign value is "1". Block 836 analyzes the decompressed integer mantissa to determine the bit position of the most significant "1", which is the leftmost nonzero bit that is not a sign extension bit. The bit position, b, is used to determine a left-shift value e_shift by, $$e\_shift = Nbits - 1 - b \quad (4)$$

To reconstruct the mantissa, the left-shifter 838 shifts the selected mantissa based on the left-shift value e_shift and block 840 clears the hidden bit. For the IEEE 754 standard, the reconstructed mantissa would have 23 bits for single precision or 52 bits for double precision. To reconstruct the exponent, the adder 842 computes the difference of e_shift and EXP_SCALE. For the IEEE 754 standard, the reconstructed exponent would have 8 bits for single precision or 11 bits for double precision. Alternatively, when the original floating-point number was scaled by F_SCALE, the EXP_SCALE value and the adder 842 are not used. In this case, the e_shift provides the exponent value, exp, and the reconstructed floating-number is divided by F_SCALE. Preferably, the F_SCALE or EXP_SCALE parameter is retrieved from the packet header of the compressed data packet.

The embodiments of the integer and floating-point compression and decompression described herein may be implemented in a variety of computing architectures. For example, the above-referenced '312 application describes configurable compressors/decompressors for integer or floating-point data compression in a multi-core computing architecture. The compression and decompression technology described herein may be applied by the configurable compressors and decompressors described in the '312 application.

My above-referenced patent applications entitled, "Processing System and Method Including Data Compression API" and "Data Compression for Direct Memory Access Transfers" describe embodiments that can be applied for the integer and floating-point compression and decompression described herein. An application programming interface API, including a set of operations and parameters for the operations, provides for data compression and decompression during or in conjunction with processes for moving data between memory elements of a memory system in a computer system. The set of operations can be configured to use the parameters and perform the operations of the API. One example set of operations of an API for compression and decompression includes functions that support direct memory access (DMA) operations. A compression channel DMA transfer can compress a specified data set from a first memory element for transfer and storage as a compressed data set in a second memory element. Compression channel descriptors for an API can be associated with a DMA operation using the compression functions. The register set holding the compression function descriptors can be written and controlled by a component or components of a compression/decompression library implementing the API. The compression DMA descriptor can include parameters indicating number and length of compressed data packets for the compressed data set, and parameters to configure compression operations, such as parameters that are manual settings, initial settings, determined by other functions of the data processing or that are constant for a particular data set to be compressed. For a decompression channel DMA transfer, a compressed data set is transferred from the second memory element and decompressed prior to storage in the first memory element. Decompression channel descriptors for an API can be associated with a DMA operation using the decompression functions. A register set holding the decompression function descriptors can be written and controlled by a component or components of a compression/decompression library. The decompression DMA descriptor can include parameters indicating number and length of compressed data packets for the compressed data set to be decompressed.

For example, the compression DMA descriptor can include parameters related as follows:

N_FIFO: corresponds to N in FIGS. 18 and 24.

RR_STRIDE2: corresponds to the sample separation parameter for the selector 354 (FIG. 18) and the selector 814 (FIG. 24).

RR_MANUAL_STRIDE1: corresponds to a manual setting for the sample separation parameter for the selector 346 (FIG. 18) and the selector 806 (FIG. 24).

RR_MANUAL_ADD_SUB: corresponds to manual settings for the add/subtract elements 348 and 358 (FIG. 18) and the add/subtract elements 808 and 818 (FIG. 24).

RR_MANUAL_DERIV: corresponds to a manual setting of the selection parameter for the selector 362 (FIG. 18) and selector 800 (FIG. 24).

RR_AUTO_MANUAL: corresponds to providing automatic or manual settings for three parameters: sample separation parameter STRIDE1 for the selector 346 (FIG. 18) and the selector 806 (FIG. 24), ADD_SUB settings for the add/subtract elements 348 and 358 (FIG. 18) and the add/subtract elements 808 and 818 (FIG. 24), and DERIV selection parameter for the selector 362 (FIG. 18) and selector 800 (FIG. 24).

ATTEN: corresponds to the attenuation factor for the attenuator 332 in FIG. 18.

The packet header of the compressed data packet can include parameters related as follows:

ATTEN: corresponds to the attenuation factor for the attenuator 332 in FIG. 18.

STRIDE1: corresponds to the sample separation parameter for the selector 346 (FIG. 18) and the selector 806 (FIG. 24).

ADD_SUB: corresponds to settings for the add/subtract elements 348 and 358 (FIG. 18) and the add/subtract elements 808 and 818 (FIG. 24).

DERIV: corresponds to the selection parameter for the selector 362 (FIG. 18) and selector 800 (FIG. 24).

MAX_EXP: corresponds to the EXP_SCALE value used by the float to integer format converter 302 (FIG. 9) and the integer to float format converter 708 (FIG. 25).

The floating-point compression and decompression operations can be implemented in hardware, software or a combination of both, and incorporated in computing systems, such as those described in FIGS. 2 to 6. The hardware implementations include ASIC, FPGA or an intellectual property (IP) block. The floating-point compression and decompression operations can be implemented in software or firmware on a programmable processor, such as a digital signal processor (DSP), microprocessor, microcontroller, multi-core CPU, or GPU.

The logic blocks shown in FIG. 7 for floating-point data conversion and compression and in FIG. 20 for decompression and optional conversion back to floating-point data, as described above, can be implemented using FPGA circuits. For implementation using FPGA circuits, the technology described here can include a memory storing a machine readable specification of the compression logic, and a machine readable specification of the decompression logic, in the form of a configuration file for the FPGA block. The logic blocks shown in FIG. 7 for compression and FIG. 20 for decompression may be described using computer aided design tools and expressed (or represented), as data and/or instructions embodied in various computer-readable media, in terms of their behavioral, register transfer, logic component, transistor, layout geometry, and/or other characteristics. A machine readable specification of the compression logic, and a machine readable specification of the decompression logic can be implemented in the form of such behavioral, register transfer, logic component, transistor, layout geometry and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. A memory including computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, netlist generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

I claim:

1. A method for transfer of floating-point data across a data transfer interface connecting components of a computer system, comprising:

scaling a plurality of floating-point samples by a scale factor that is inversely proportional to a maximum floating-point value for a set of input floating-point samples, wherein each floating-point sample comprises an original number of bits in accordance with a floating-point format used in the computer system, the floating-point format defining a sign bit to represent a sign, a plurality of exponent bits to represent an exponent and a plurality of mantissa bits to represent a mantissa;

converting the plurality of scaled samples to a plurality of integer samples having an integer format used in the computer system, the integer format comprising an integer sign bit and a plurality of integer mantissa bits;

compressing the plurality of integer samples to form a plurality of compressed integer samples in accordance with one or more parameters; and encoding the plurality of compressed integer samples to form compressed data for a compressed data packet to provide to the data transfer interface.

2. The method of claim 1, wherein said scaling further comprises multiplying at least one of the plurality of floating-point samples by the scale factor.

3. The method of claim 2, wherein said scaling further comprises determining the scale factor based on a maximum magnitude value of the plurality of floating-point samples.

4. The method of claim 2, wherein said scaling further comprises determining the scale factor based on a maximum magnitude value of a previous plurality of floating-point samples.

5. The method of claim 1, further comprising encoding the scale factor for the compressed data packet.

6. The method of claim 1, further comprising encoding at least one of the parameters for the compressed data packet.

7. The method of claim 1, wherein said compressing provides a lossless compression or a lossy compression in accordance with at least one of the parameters.

8. A method for transfer of floating-point data across a data transfer interface connecting components of a computer system, comprising:

scaling a plurality of floating-point samples by a scale factor, wherein each floating-point sample comprises an original number of bits in accordance with a floating-point format used in the computer system, the floating-point format defining a sign bit to represent a sign, a plurality of exponent bits to represent an exponent and a plurality of mantissa bits to represent a mantissa;

converting the plurality of scaled samples to a plurality of integer samples having an integer format used in the computer system, the integer format comprising an integer sign bit and a plurality of integer mantissa bits;

compressing the plurality of integer samples to form a plurality of compressed integer samples in accordance with one or more parameters; and encoding the plurality of compressed integer samples to form compressed data for a compressed data packet to provide to the data transfer interface, wherein said scaling further comprises subtracting the exponents of the plurality of floating-point samples from the scale factor.

9. The method of claim 8, wherein said scaling further comprises determining the scale factor based on a maximum exponent value of the plurality of floating-point samples.

10. The method of claim 8, wherein said scaling further comprises determining the scale factor based on a maximum exponent value of a previous plurality of floating-point samples.

11. A method for transfer of floating-point data across a data transfer interface connecting components of a computer system, comprising:

scaling a plurality of floating-point a scale factor, wherein each floating-point sample comprises an original number of bits in accordance with a floating-point format used in the computer system, the floating-point format defining a sign bit to represent a sign, a plurality of exponent bits to represent an exponent and a plurality of mantissa bits to represent a mantissa;

converting the plurality of scaled samples to a plurality of integer samples having an integer format used in the computer system, the integer format comprising an integer sign bit and a plurality of integer mantissa bits;

compressing the plurality of integer samples to form a plurality of compressed integer samples in accordance with one or more parameters;

encoding the plurality of compressed integer samples to form compressed data for a compressed data packet to provide to the data transfer interface;

storing a number N of previous integer samples in a first-in-first-out (FIFO) buffer;

retrieving one of the previous integer samples from the FIFO buffer based on a first parameter to produce a selected sample;

adding or subtracting the selected sample with a current integer sample in accordance with a second parameter to produce a first result sample; and selecting based on a third parameter one of the first result sample or the current integer sample for said encoding.

12. The method of claim 11, wherein said compressing further comprises:

storing a second number M of previous first result samples in a second FIFO buffer;

retrieving one of the previous first result samples from the second FIFO buffer based on a fourth parameter to produce a second selected sample; and adding or subtracting the second selected sample with the current first result sample in accordance with a fifth parameter to produce a second result sample, wherein said selecting selects one of the first result sample, the second result sample or the current integer sample based on the third parameter for said encoding.

13. The method of claim 11, wherein said compressing further comprises:

storing a second number M of the previous integer samples in a second FIFO buffer;

retrieving one of the previous integer samples from the second FIFO buffer based on a fourth parameter to produce a second selected sample; and adding or subtracting the second selected sample with the current integer sample in accordance with a fifth parameter to produce a second result sample, wherein said selecting selects one of the first result sample, the second result sample or the current integer sample based on the third parameter for said encoding.

14. The method of claim 11, wherein said compressing further comprises:

selecting the first result sample or the integer sample as an intermediate sample in accordance with a fourth parameter;

storing a second number M of previous intermediate samples in a second FIFO buffer;

retrieving one of the previous intermediate samples from the second FIFO buffer based on a fifth parameter to produce a second selected sample; and adding or subtracting the second selected sample with the current intermediate sample in accordance with a sixth parameter to produce a second result sample, wherein said selecting based on the third parameter selects one of the first result sample, the second result sample or the current integer sample for said encoding.

15. The method of claim 11, wherein said compressing further comprises attenuating the integer samples based on an attenuation factor to form attenuated integer samples, wherein the attenuated integer samples are applied to the storing, the adding or subtracting and the selecting, instead of the integer samples.

16. The method of claim 11, wherein said compressing further comprises determining the third parameter based on a higher compression efficiency.

17. The method of claim 1, wherein said encoding applies block floating point encoding to the plurality of compressed integer samples to form the compressed data.

18. An apparatus for transfer of floating-point data across a data transfer interface connecting components of a computer system, comprising:
   logic to scale a plurality of floating-point samples by a scale factor that is inversely proportional to a maximum floating-point value for a set of input floating-point samples, wherein each floating-point sample comprises an original number of bits in accordance with a floating-point format used in the computer system, the floating-point format defining a sign bit to represent a sign, a plurality of exponent bits to represent an exponent and a plurality of mantissa bits to represent a mantissa;
   logic to convert the plurality of scaled samples to a plurality of integer samples having an integer format used in the computer system, the integer format comprising an integer sign bit and a plurality of integer mantissa bits;
   integer compression logic to compress the plurality of integer samples to form a plurality of compressed integer samples in accordance with one or more parameters; and
   an encoder to encode the plurality of compressed integer samples to form compressed data for a compressed data packet to provide to the data transfer interface.

19. The apparatus of claim 18, wherein the logic to scale further comprises a multiplier to multiply at least one of the plurality of floating-point samples by the scale factor.

20. The apparatus of claim 19, wherein the logic to scale further comprises logic to determine a maximum magnitude value of the plurality of floating-point samples.

21. The apparatus of claim 19, wherein the logic to scale further comprises logic to determine a maximum magnitude value of a previous plurality of floating-point samples.

22. The apparatus of claim 18, wherein the encoder further comprises block floating point encoder applied to the plurality of compressed integer samples to form the compressed data.

23. The apparatus of claim 18, wherein the encoder encodes the scale factor for the compressed data packet.

24. The apparatus of claim 18, wherein the encoder encodes at least one of the parameters for the compressed data packet.

25. The apparatus of claim 18, wherein the integer compression logic provides a lossless compression or a lossy compression in accordance with at least one of the parameters.

26. An apparatus for transfer of floating-point data across a data transfer interface connecting components of a computer system, comprising:
   logic to scale a plurality of floating-point samples by a scale factor, wherein each floating-point sample comprises an original number of bits in accordance with a floating-point format used in the com m the floating-point format defining a sign bit to represent a sign, a plurality of exponent bits to represent an exponent and a plurality of mantissa bits to represent a mantissa;
   logic to convert the plurality of scaled samples to a plurality of integer samples having an integer format used in the computer system, the integer format comprising an integer sign bit and a plurality of integer mantissa bits;
   integer compression logic to compress the plurality of integer samples to form a plurality of compressed integer samples in accordance with one or more parameters; and
   an encoder to encode the plurality of compressed integer samples to form compressed data for a compressed data packet to provide to the data transfer interface
   wherein the logic to scale further comprises a subtractor to subtract each exponent of the plurality of floating-point samples from the scale factor.

27. The apparatus of claim 26, wherein the logic to scale further comprises logic to determine a maximum exponent value of the plurality of floating-point samples.

28. The apparatus of claim 26, wherein the logic to scale further comprises logic to determine a maximum exponent value of a previous plurality of floating-point samples.

29. An apparatus for transfer of floating-point data across a data transfer interface connecting components of a computer system, comprising:
   logic to scale a plurality of floating-point samples by a scale factor, wherein each floating-point sample comprises an original number of bits in accordance with a floating-point format used in the computer system, the floating-point format defining a sign bit to represent a sign, a plurality of exponent bits to represent an exponent and a plurality of mantissa bits to represent a mantissa;
   logic to convert the plurality of scaled samples to a plurality of integer samples having an integer format used in the computer system, the integer format comprising an integer sign bit and a plurality of integer mantissa bits;
   integer compression logic to compress the plurality of integer samples to form a plurality of compressed integer samples in accordance with one or more parameters;
   an encoder to encode the plurality of compressed integer samples to form compressed data for a compressed data packet to provide to the data transfer interface;
   a first-in-first-out (FIFO) buffer to store a number N of previous integer samples;
   a first selector to retrieve one of the previous integer samples from the FIFO buffer based on a first parameter to produce a selected sample;
   a configurable adder/subtractor to add or subtract the selected sample with a current integer sample in accordance with a second parameter to produce a first result sample; and
   a second selector to select one of the first result sample or the current integer sample based on a third parameter to provide to the encoder.

30. The apparatus of claim 29, wherein said integer compression logic further comprises:
   a second FIFO buffer to store a second number M of previous first result samples;
   a third selector to retrieve one of the previous first result samples from the second FIFO buffer based on a fourth parameter to produce a second selected sample; and
   a second configurable adder/ subtractor to add or subtract the second selected sample with the current first result sample in accordance with a fifth parameter to produce a second result sample, wherein said second selector selects one of the first result sample, the second result sample or the current integer sample based on the third parameter to provide to the encoder.

31. The apparatus of claim 29, wherein said integer compression logic further comprises:
   a second FIFO buffer to store a second number M of the previous integer samples;
   a third selector to retrieve one of the previous integer samples from the second FIFO buffer based on a fourth parameter to produce a second selected sample; and
   a second configurable adder/ subtractor to add or subtract the second selected sample with the current integer sample in accordance with a fifth parameter to produce a second result sample, wherein said second selector selects one of the first result sample, the second result sample or the current integer sample based on the third parameter to provide to the encoder.

32. The apparatus of claim 29, wherein said integer compression logic further comprises:
   a third selector to select the first result sample or the integer sample as an intermediate sample in accordance with a fourth parameter;
   a second FIFO buffer storing a second number M of previous intermediate samples;
   a fourth selector to retrieve one of the previous intermediate samples from the second FIFO buffer based on a fifth parameter to produce a second selected sample; and
   a second configurable adder/ subtractor to add or subtract the second selected sample with the current intermediate sample in accordance with a sixth parameter to produce a second result sample, wherein said second selector selects one of the first result sample, the second result sample or the current integer sample based on the third parameter to provide to the encoder.

33. The apparatus of claim 29, wherein said integer compression logic further comprises an attenuator to attenuate the integer samples based on an attenuation factor to form attenuated integer samples, wherein the attenuated integer samples are applied to the FIFO buffer, the configurable adder/subtractor and the second selector, instead of the integer samples.

34. The apparatus of claim 29, wherein said integer compression logic further comprises logic to determine the third parameter based on a higher compression efficiency.

* * * * *